(12) United States Patent
Blom-Schieber et al.

(10) Patent No.: US 10,549,491 B2
(45) Date of Patent: Feb. 4, 2020

(54) SYSTEM AND METHOD FOR EDGE LENGTH DIFFERENTIAL MEASUREMENT FOR FIBER STEERING IN AUTOMATED FIBER PLACEMENT

(71) Applicant: THE BOEING COMPANY, Chicago, IL (US)

(72) Inventors: Adriana Willempje Blom-Schieber, Shoreline, WA (US); Troy Winfree, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/697,225

(22) Filed: Sep. 6, 2017

(65) Prior Publication Data

US 2019/0070800 A1    Mar. 7, 2019

(51) Int. Cl.
*B29C 70/38* (2006.01)
*B29C 70/54* (2006.01)

(52) U.S. Cl.
CPC .......... *B29C 70/386* (2013.01); *B29C 70/541* (2013.01); *B29C 70/545* (2013.01)

(58) Field of Classification Search
CPC ..... B29C 70/38; B29C 70/382; B29C 70/384; B29C 70/386; B29C 70/388; B29C 70/541; B29C 70/545
See application file for complete search history.

(56) References Cited

U.S. PATENT DOCUMENTS

| | | |
|---|---|---|
| 6,799,081 B1 | 9/2004 | Hale et al. |
| 8,756,037 B2 | 6/2014 | Rassaian et al. |
| 9,738,054 B2 | 8/2017 | Blom |
| 2007/0144676 A1* | 6/2007 | Tang ............... B29C 70/386 156/425 |
| 2010/0286808 A1* | 11/2010 | Wyatt .............. B29C 70/386 700/97 |
| 2014/0288893 A1* | 9/2014 | Blom .............. G06F 17/5018 703/1 |
| 2016/0221271 A1* | 8/2016 | Yarker ............. B29C 70/02 |

FOREIGN PATENT DOCUMENTS

WO    20160122946 A1    8/2016

OTHER PUBLICATIONS

Guldu, S., "Analysis and Optimization of Cylindrical Structures Manufactured by Automated Fiber Placement Techinque," A Thesis Submitted to the Graduate School of Natural and Applied Sciences of Middle East Technical University, Jan. 2014, 133 pages.
Communication pursuant to Artcle 94(3) EPC for Application No. 18181198.4 dated Feb. 19, 2019, 4 pgs.
European Search Report for Application No. 18181198.5 dated Feb. 5, 2019, 5 pgs.

* cited by examiner

*Primary Examiner* — George R Koch
(74) *Attorney, Agent, or Firm* — Moore IP Law

(57) ABSTRACT

A method of determining tow path surfaces associated with manufacturing a composite ply includes computing, from an initial tow path surface, a projected tow path surface corresponding to a projection of the initial tow path surface onto a layup surface. The method also includes determining, for particular start and end points, edge lengths of opposing sides of the projected tow path surface. The method further includes comparing a difference between the edge lengths of the opposing sides to a threshold, to determine if the amount of curvature along the projected tow path surface is acceptable.

20 Claims, 11 Drawing Sheets

SYSTEM AND METHOD FOR EDGE LENGTH DIFFERENTIAL MEASUREMENT FOR FIBER STEERING IN AUTOMATED FIBER PLACEMENT

FIELD OF THE DISCLOSURE

The present disclosure is generally related to forming parts of composite material by automated fiber placement.

BACKGROUND

Automated fiber placement devices form composite parts by applying a plurality of narrow strips of material (e.g., carbon fiber impregnated with resin) referred to as tows. An automated fiber placement machine may apply tows by depositing the tows with a roller or other device. For example, the tows may be compacted onto a layup surface by one or more compaction rollers. The automated fiber placement device applies or places multiple adjacent tows to form a contiguous array or band, referred to as a course. Each tow of the course has a fixed width. Multiple courses are applied to form a single layer of tows, referred to as a ply. A composite part includes multiple plies (e.g., a set of plies), and plies of the set of plies are often oriented in different directions (e.g., a 0 degree ply, a +45 degree ply, a 90 degree ply, and a −45 degree ply). An orientation of the ply refers to a nominal direction of the tows (and the composite fibers thereof) of the ply.

During tow application, some automated fiber placement devices can steer the tows of a course to follow a non-linear path (e.g., a curved path). If a course does not follow a geodesic path (e.g., a shortest straight line path on a surface) the course is said to be steered at a steering radius. The steering radius is the reciprocal of the geodesic curvature, usually measured at a particular point along a course centerline. While steering a course, the distance traveled by an inner edge of a roller is less than the distance traveled by an outer edge of the roller. Because the tows are dispensed at a constant rate across the width of the roller, excess composite tow material builds up in front of the roller when the tows of the course are steered. The excess tow material can cause wrinkling (e.g., an edge of the tow folds over on the tow) and puckering (e.g., a buckling of the tow) of tow material to occur. Typically, an upper limit on allowed steering radius is used to avoid wrinkling or puckering. However, using the steering radius (e.g., a local measurement) to predict and prevent tow wrinkling or puckering does not take into account any cumulative steering effects along a course.

Wrinkling or puckering of tows may cause local distortions of the fibers, which may negatively affect the fiber's capability, and consequently the composite part's capability, to carry load. A puckered tow might also fold over when a course of a subsequent ply is laid down, causing an inhomogeneous distribution of the fibers in the ply, as well as a thickness variation. An inhomogeneous distribution of the fibers may cause a local weakness in the part, affecting its structural capability. A thickness variation may affect the final surface quality of the part, which may require rework through filling, sanding, or shimming.

Wrinkled or puckered tows may be reworked by hand by lifting and repositioning tows before any subsequent plies are laid down. Puckers may temporarily be suppressed by locally compacting the area near the pucker by hand, or by compacting the entire part under vacuum. Reworking the part adds time and cost to the production of the part. If the part design is such that the desired fiber orientation requires a tow to follow a particular path, reapplying a tow by hand may not eliminate the pucker or wrinkle, and any reduction in load carrying capability of the part due to wrinkles may need to be mitigated by adding material, resulting in a heavier part.

SUMMARY

In a particular implementation, a method of determining tow path surfaces associated with manufacturing a composite ply includes computing, from an initial tow path surface, a projected tow path surface corresponding to a projection of the initial tow path surface onto a layup surface. The method also includes determining, for particular start and end points, edge lengths of opposing sides of the projected tow path surface. The method further includes comparing a difference between the edge lengths of the opposing sides to a threshold, to determine if the amount of curvature along the projected tow path surface is acceptable.

In another particular implementation, a system includes a computer configured to receive part data corresponding to a part. The computer is also configured to determine an initial tow path surface based on the part data. The initial tow path surface corresponds to a path of a roller along the roller's contact with the part geometry. The computer is configured to compute, from the initial tow path surface, a projected tow path surface corresponding to a projection of the initial tow path surface onto a layup surface. The computer is configured to determine, for particular start and end points, edge lengths of opposing sides of the projected tow path surface. The computer is also configured to compare a difference between the edge lengths of the opposing sides to a threshold, to determine if the amount of curvature along the projected tow path surface is acceptable. The computer is further configured to output a geometry file for an automated fiber placement machine, the geometry file including a plurality of machine readable instructions.

In another particular implementation, a non-transitory processor-readable medium stores processor-executable instructions that, when executed by a processor, cause the processor to compute, from an initial tow path surface, a projected tow path surface corresponding to a projection of the initial tow path surface onto a layup surface. The instructions also cause the processor to determine, for particular start and end points, edge lengths of opposing sides of the projected tow path surface. The instructions further cause the processor to compare a difference between the edge lengths of the opposing sides to a threshold, to determine if an amount of curvature along the projected tow path surface is acceptable.

The features, functions, and advantages described herein can be achieved independently in various implementations or may be combined in yet other implementations, further details of which can be found with reference to the following description and drawings.

DETAILED DESCRIPTION

Figure 1:
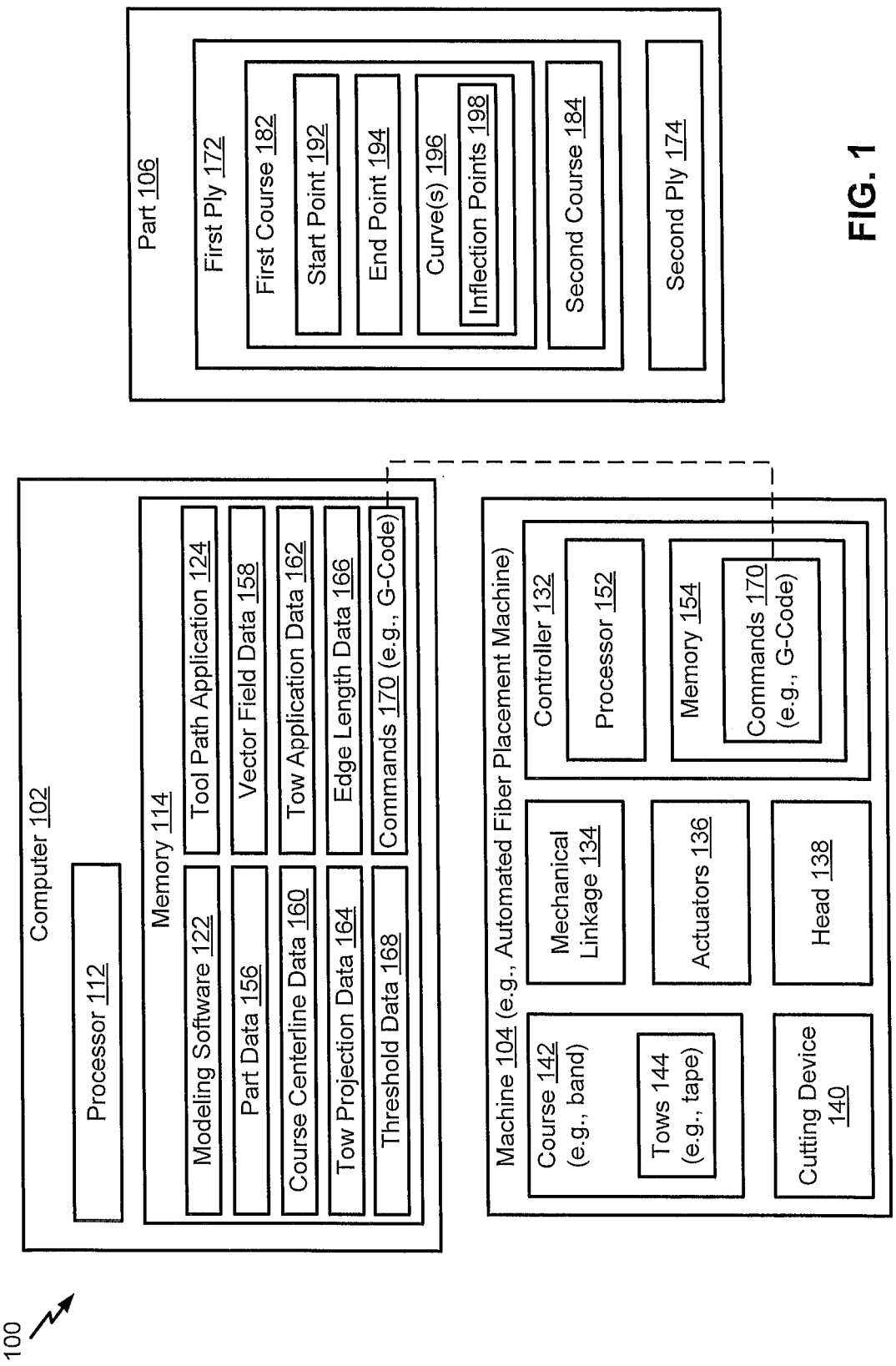
FIG. 1 is a block diagram that illustrates a system including a computer and an automated fiber placement machine.

Implementations described herein are directed to systems and methods for forming a part of composite material using automated fiber placement. The systems and methods include generating tool paths and machine readable instructions (e.g., G-code) for an automated fiber placement machine and forming the part using the automated fiber placement machine. The systems and methods disclosed herein are used to predict and reduce the extent of wrinkling and puckering of tow material when steering tows along a course by accounting for cumulative effects of edge length differences of a tow along the course. For example, lengths of opposing edges of a tow are determined and an edge length difference (e.g., an edge length delta) is compared to a threshold to predict wrinkling and puckering of tow material. If the edge length difference is less than or equal to the threshold, the part proceeds to production (e.g., the tool paths and the machine readable instructions are generated to instruct an automated fiber placement machine) or a second edge length difference calculation is performed for wider tows which yield higher layup rates (e.g., wider tows experience greater edge length differences for a particular curve and are more susceptible to wrinkling and puckering). If the threshold is not satisfied, one or more variables of the production process are adjusted or performance characteristics of the part are reduced, such as strength or stiffness knockdowns, which typically results in increased part weight. Adjusting one or more variables of the part design and production process includes redesigning the part to have softer curves with a lower steering radius, adjusting the path of the courses on the part surface, narrowing the width of the tows, using a different material system (e.g., a different type of fiber for the tow), or a combination thereof. An updated edge length difference is determined after adjusting or updating the design of the part or tow width. The updated edge length difference is compared to the threshold or another threshold to determine if the path of the course is acceptable. The value of the threshold is changed if the tow width or the material system is changed.

The deviations or anomalies (e.g., wrinkles or puckers) referenced herein result from a curvature along the planned course geometries or paths. These deviations or anomalies are distinct from deviations or anomalies that may occur due to equipment or material tolerances or process variations. For example, variations in thickness or width of the tows may cause unintended deviations or anomalies. Additionally, tow placement variations by the automated fiber placement machine may cause unintended deviations or anomalies.

By calculating the edge length difference and comparing the edge length difference to a threshold, deviations or anomalies may be predicted during the design process and before the part is manufactured. Thus, the deviations or anomalies may be reduced or eliminated before production of the part. As a result, less or no rework is employed during layup (e.g., formation) of the part. Accordingly, time and costs associated with production of the part are reduced, and the part may have reduced weight due to higher load carrying capability of the fibers.

FIG. 1 is a block diagram that illustrates an example of a system 100 for forming a part. The system 100 includes a computer 102 and a machine 104, such as an automated fiber placement machine. The system 100 is capable of designing a composite part, generating tool paths used to create the composite part, converting the tool paths into machine readable instructions, and forming the composite part based on the machine readable instructions. An example of a part 106 produced by the system 100 and the machine 104 is illustrated in FIG. 1. In a particular implementation, the part 106 is a composite laminate part.

The computer 102 includes a processor 112 and a memory 114. In some implementations, the memory 114 is configured to store modeling software 122. The processor 112 is configured to execute the modeling software 122, and the modeling software 122 is configured to generate part data 156. The modeling software 122 includes or corresponds to a computer aided design (CAD) application, a computer aided engineering (CAE) application, a computer aided manufacturing (CAM) application, a product lifecycle management (PLM) application, or a combination thereof. In a particular implementation, the modeling software 122 includes a surface-based modeling program, a solids-based modeling programs, or a combination thereof, such as CATIA® or SolidWorks®, registered trademarks of Dassault Systemes, or Siemens NX® (previously known as Unigraphics), a registered trademark of Siemens PLM Software. The part data 156 includes or corresponds to a three-dimensional (3D) model of a composite part, such as the part 106. In a particular implementation, the part 106 includes one or more curved surfaces (e.g., a curved surface with varying curvature) or tapered surfaces. As an illustrative, non-limiting example, the part 106 is a fuselage skin of an aircraft. In other implementations, the part 106 includes surfaces that are flat or have parallel edges (e.g., does not include curved surfaces or taper).

The memory 114 is configured to store a tool path application 124, the part data 156, vector field data 158, course centerline data 160, tow application data 162, tow projection data 164, edge length data 166, threshold data 168, and commands 170 (e.g., G-code). The vector field data 158 includes or indicates a vector field having a plurality of vectors each corresponding to points on a surface of the part 106 or a ply thereof. For example, the plurality of vectors indicate a local orientation of fibers on the surface of the part 106. The processor 112 is configured to execute the tool path application 124, and the tool path application 124 is configured to generate the vector field data 158 based on the part data 156.

The course centerline data 160 includes or indicates one or more course centerlines, and the tool path application 124 is configured to determine the course centerlines from the vector field data 158. For example, a course centerline is generated by following a particular path indicated by the vector field.

The tow application data 162 includes or indicates a path (e.g., a tow roller path) that each tow roller will follow when a head 138 of the machine 104 follows a particular course centerline indicated by the course centerline data 160. The tool path application 124 is configured to determine the tow application data 162 based on the course centerline data 160 and characteristics of the head 138, the course, or both. For example, the characteristics of the head 138 may include a tow width, a count of tows, a property of rollers of the head 138, or a combination thereof.

Figure 4:
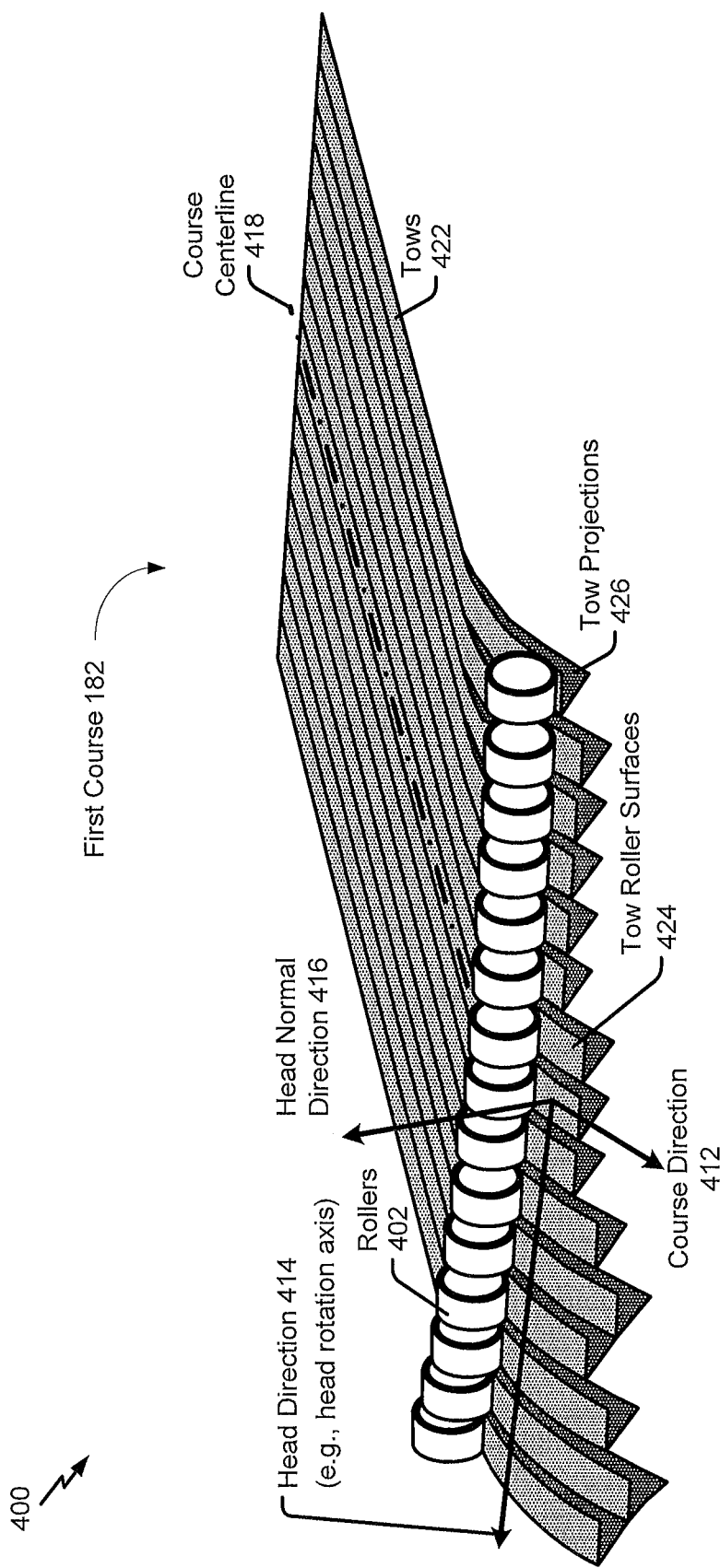
FIG. 4 is a diagram that illustrates an example of a head of an automated fiber placement machine.

The tow projection data 164 includes or indicates projections of the tow roller paths (e.g., tow projection paths) of the tow application data 162 onto the layup surface on which the tows will be placed to form the part 106, as described further with reference to FIG. 4. The tool path application 124 is configured to determine the tow projection data 164 based on the tow application data 162.

The edge length data 166 includes or indicates edge lengths of opposing sides of each tow projection path and includes or indicates a difference between the edge lengths (e.g., an edge length difference or delta) of each tow projection path. The tool path application 124 is configured to determine the edge length data 166 based on the tow projection data 164, a relaxation factor, or both. Determination of the edge length data 166 and the relaxation factor are described further with reference to FIG. 8.

The threshold data 168 includes or indicates one or more thresholds for comparing the edge length difference of each tow projection path. Each threshold of the one or more thresholds may correspond to one or more characteristics of the tows, such as a tow width, a tow material, or both, and to one or more process parameters, such as temperature, a layup speed, a compaction pressure, a tow tension, humidity, a roller type, etc. The threshold data 168 may include data for computing a threshold (e.g., logic or an equation) or the threshold data 168 may include or correspond to a data table and thresholds are retrieved based on one or more inputs. Threshold values may be determined experimentally or by physical modeling. Material properties such as tackiness (which may vary with temperature and humidity), surface texture and tow stiffness influence the threshold. For example, greater tackiness, greater compaction pressure, or greater tow tension (within limits) will increase the threshold value, whereas higher material stiffness is likely to decrease the threshold value.

The tool path application 124 is configured to generate the commands 170 based on the part data 156, the course centerline data 160, the tow projection data 164, or a combination thereof. For example, the tool path application 124 generates tool paths for a specific tool (e.g., the machine 104) to generate the part 106. The tool paths correspond to routes that the tool or tool head will take to place composite fiber strips or tape (tows) to form the part 106. Additionally, the tool paths include curved paths (e.g., non-geodesic paths). The tool path application 124 is configured to convert the tool paths into the commands 170. The commands 170 include machine readable instructions that are executable by the tool (e.g., the machine 104). For example, the commands 170 may include instructions to apply a course of 6 tows at coordinates (X1,Y1) in a straight line to coordinates (X2, Y2) and to steer the course with a particular radius of curvature or steering radius at the coordinates (X2,Y2) until coordinates (X3,Y3). Although the modeling software 122 and the tool path application 124 are illustrated as separate programs in FIG. 1, in other implementations, the modeling software 122 includes the tool path application 124.

Although the computer 102 is illustrated as including the modeling software 122 and the tool path application 124 in FIG. 1, in other implementations, a first computer includes the modeling software 122 and a second computer (e.g., the computer 102) includes the tool path application 124. In such implementations, the first computer generates the part data 156, and the second computer receives the part data 156 from the first computer.

The machine 104 includes a controller 132, mechanical linkage 134, actuators 136, and the head 138. The machine 104 is configured to apply tows 144 to form the part 106. The machine 104 may include or correspond to a gantry type machine or a robotic arm (e.g., 6 axis or 6 degree of freedom) type machine.

The mechanical linkage 134 and actuators 136 are configured to position and move the head 138 responsive to control signals from the controller 132. The mechanical linkage 134 and actuators 136 are configured to steer the head 138 along a tool path, which may be a curved path. The head 138 is configured to apply the tows 144 as courses 142 to form plies responsive to control signals from the controller 132. Each course 142 includes a plurality of tows 144 (e.g., a band of tows). In some implementations, the head 138 includes a plurality of a rollers (e.g., compaction rollers) configured to apply or place the tows 144. Each tow of the plurality of tows has a corresponding roller. Each of the plurality of rollers is configured to move independently from other rollers (e.g., in a vertical or a head normal direction), as further described with reference to FIG. 4. Additionally, each of the plurality of rollers is configured to be deformable (e.g., conforms to a shape of the part 106, such as a mandrel onto which the tows are applied to form the part 106). In some implementations, the head 138 further includes a heater configured to heat the tows 144 before or during application. In other implementations, the head 138 includes a single roller and each of the multiple tows may share the single roller.

The head 138 includes individual tow speed feed control for each of the individual rollers or tows. The individual tow speed feed control can be used to accommodate for deviations or anomalies caused by edge length differences within a course. To illustrate, when a course is wide enough, a roller corresponding to an outer tow of a curve of a course has increased feed speed to account for the longer travel path of the outer tow as compared to the shorter travel part of an inner tow of the curve. The individual speed tow feed control does not account for deviations or anomalies caused by edge length differences of a single tow.

The machine 104 (e.g., the head 138) includes a cutting device 140 configured to cut (e.g., by a perpendicular cut, also called a butt cut) the tows 144 of the course 142. The cutting device 140 has individual tow control. To illustrate, the cutting device 140 is configured to perform a tow drop by cutting individual tows of the course 142 at different positions along the length of the course 142. Selectively removing and adding tows to the course 142 (selective application of different numbers of tows) enables the machine 104 to adjust (e.g., narrow or widen) a width of the course 142 over the length of the course 142.

The machine 104 may form the part 106 on a mandrel (not shown). For example, the machine 104 applies the tows 144 on the mandrel. The mandrel is configured to receive the tows 144 and support the part 106. The mandrel may have an exterior shape or contour that corresponds to an exterior shape or contour of the part 106.

The controller 132 includes a processor 152 and a memory 154. The memory 154 is configured to store the commands 170. The controller 132 is configured to generate the control signals to control and activate the actuators 136 and the head 138. To illustrate, the processor 152 reads and executes the commands 170 to move the mechanical linkage 134 and the head 138 by activating or controlling the actuators 136 via control signals. Additionally, control signals are sent to the head 138 and the cutting device 140 to control tow drops and adjust the width of the course 142.

In some implementations, the machine 104 receives the commands 170 from the computer 102 via a network connection. In other implementation, the machine 104 receives the commands 170 via a portable storage media. Although, the computer 102 and the machine 104 are illustrated as separate devices in the implementation illustrated in FIG. 1, in other implementations, the computer 102 and the machine 104 are integrated into one device or system.

During operation of the system 100, the computer 102 generates or receives the part data 156 corresponding to a particular composite part, such as the part 106, to be formed by the machine 104. The tool path application 124 generates the vector field data 158 based on the part data 156 and generates the course centerline data 160 based on the vector field data 158. For example, the tool path application 124 determines a plurality of course centerline paths corresponding to a layup of plies for the part 106, by integrating vector fields associated with a contoured geometric surface of the part 106.

The tool path application 124 generates a head model for the part 106 based on the machine 104, the course centerline data 160, and a width of the tows 144 (e.g., a width of tow material or tape). To illustrate, the tool path application 124 generates the tow application data 162 indicating one or more tow roller paths (e.g., initial tow path surfaces) based on the machine 104, the course centerline data 160, and the width of the tows 144 (e.g., the width of the tow material or tape). The tow roller paths (e.g., the initial tow path surfaces) include or correspond to two-dimensional geometric entities.

Figure 5:
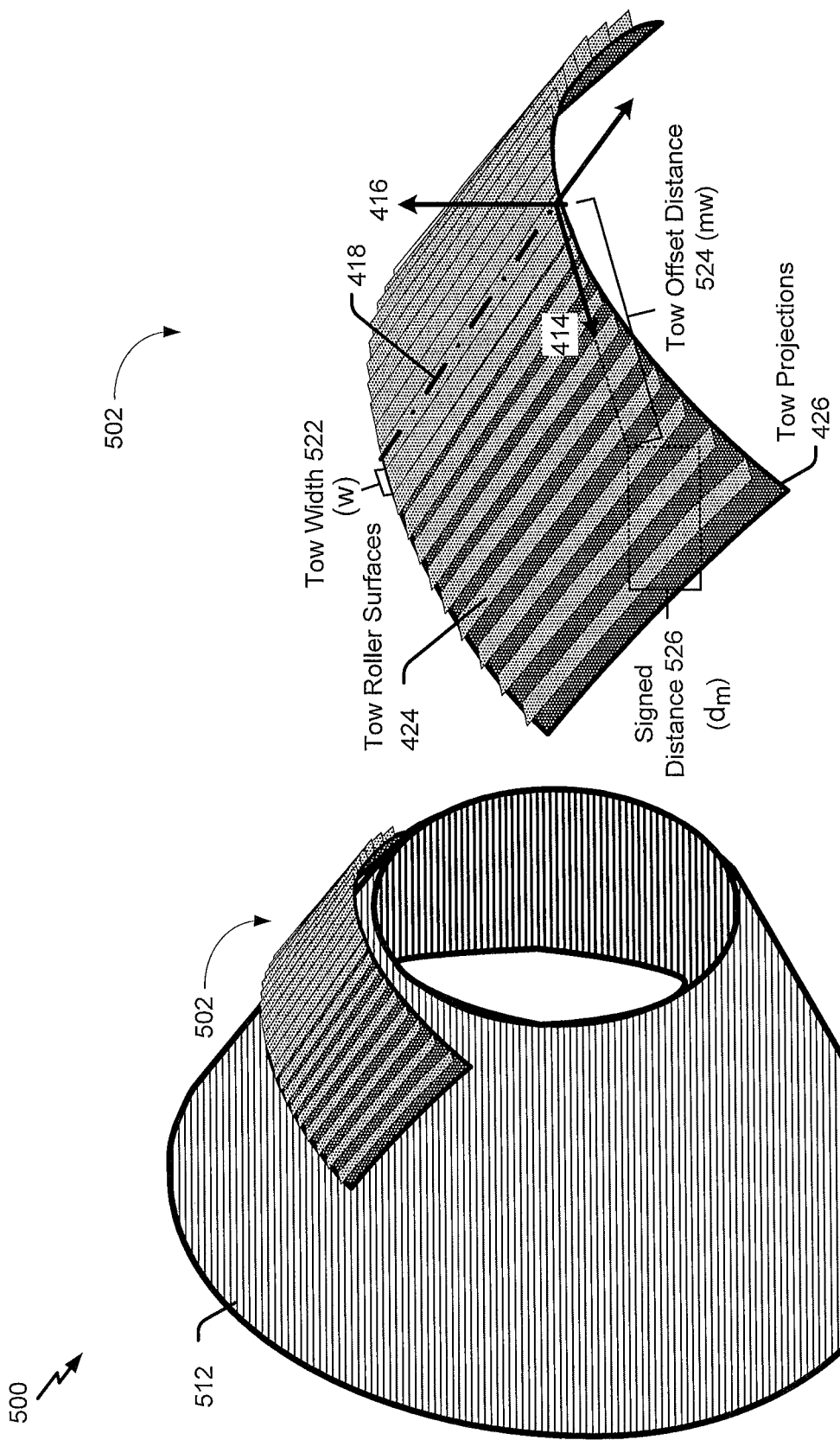
FIG. 5 is a diagram that illustrates an example of a course applied by an automated fiber placement machine onto a layup surface.

The tool path application 124 generates the tow projection data 164 indicating one or more tow projection paths based on the layup surface, the machine 104, the course centerline data 160, the width of the tows 144, the tow application data 162, or a combination thereof, as described further with reference to FIGS. 4 and 5.

Figure 8:
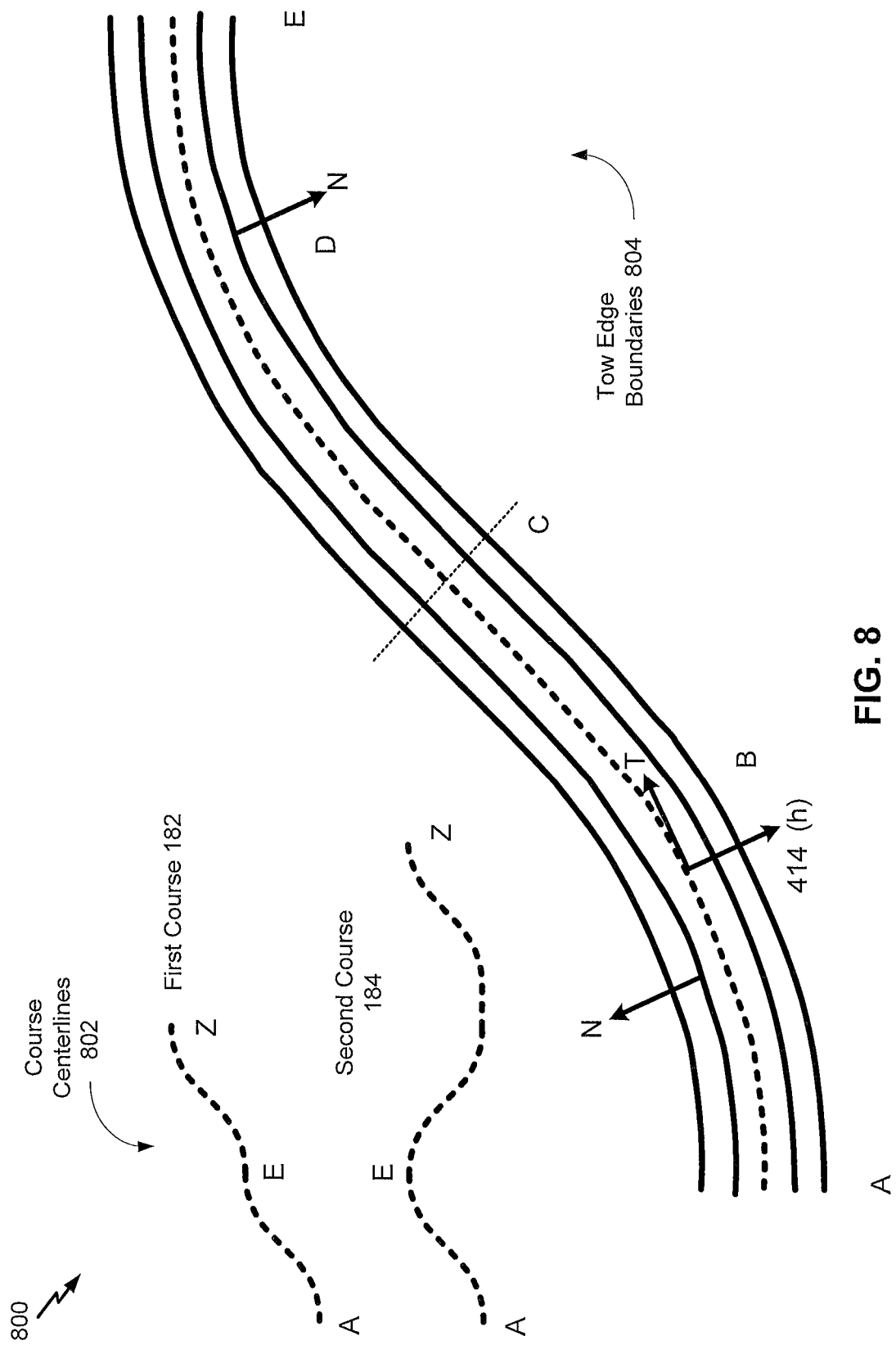
FIG. 8 is a diagram that illustrates examples of edge length difference calculations between a start point and an end point.

The tool path application 124 calculates edge length difference based on the tow projection data 164, as described further with reference to FIG. 8. The tool path application 124 may calculate multiple edge length differences for a particular course, such as one edge length difference for each tow (e.g., a tow projection path thereof). Additionally, the tool path application 124 may determine multiple edge length differences for each tow of the course. To illustrate, an edge length difference may be calculated for multiple segments (portions) of the tow roller surface or course. The segments may include or correspond to a sliding window or a portion of a curve between two inflection points.

In some implementations, the tool path application 124 calculates the edge length difference as a function of location. For example, the tool path application 124 calculates the edge length difference cumulatively along a tow projection path (e.g., a projected tow path surface). To illustrate, the tool path application 124 calculates multiple edge length differences from a start point to each point from the start point to an end point.

The tool path application 124 determines a threshold based on the tow width, the type of tow material, process parameters, or a combination thereof. For example, the tool path application 124 selects (e.g., retrieves) the threshold from the threshold data 168 or calculates the threshold based on the threshold data 168. The tool path application 124 compares the threshold to the edge length differences to determine if an amount of curvature along the projected tow path surface is acceptable (e.g., if an amount of steering radius of the tow rollers along the curved course centerlines is acceptable). The tool path application 124 or the computer 102 may output a notification based on the comparison, the application of the threshold to the edge length difference. For example, if the edge length difference is less than or equal to the threshold, the threshold is satisfied and the computer 102 outputs a notification indicating the tow projection path or course is acceptable (e.g., will not produce a wrinkle or pucker). If the edge length difference is greater than the threshold, the threshold is not satisfied and the computer 102 outputs a notification indicating the tow projection path or course is not acceptable.

In some implementations, the tool path application 124 adjusts the curvature (e.g., surface curvature) of the part (e.g., the tool layup surface), adjusts the course centerlines, decreases (e.g., narrows) the tow width, changes a material of the tows, or a combination thereof, based on the edge length data failing to satisfying the threshold. After adjusting one or more variables, the tool path application 124 may calculate a second edge length difference corresponding to the adjusted variables and compare the second edge length difference to the threshold or to a second threshold corresponding to one or more of the adjusted variables. In a particular implementation, the tool path application 124 first adjusts the curvature of the part, and then adjusts one or more other variables based on the second edge length difference failing to satisfy the threshold or the second threshold a second time.

Additionally, or alternatively, the tool path application 124 increases a tow width based on the edge length data satisfying the threshold. The tool path application 124 compares an updated or second edge length difference corresponding to the increased tow width to a second threshold corresponding to the increased tow width to determine if an amount of curvature along the projected tow path surface is acceptable.

The tool path application 124 generates tool paths based on the part data 156, the course centerline data 160, the width of the tows, the tow application data 162, or a combination thereof, when the edge length data 166 satisfies the threshold. The tool path application 124 converts the tool paths into the commands 170.

The machine 104 receives the commands 170 corresponding to the part 106 to be formed by the machine 104. The controller 132 generates control signals based on the commands 170 and sends the control signals to the actuators 136, the head 138, and the cutting device 140. The control signals activate the actuators 136 to position the head 138 and to move the head 138 along a particular tool path. The particular tool path may include or correspond to course centerlines of the course centerline data 160. The control signals activate the head 138 (e.g., the one or more compaction rollers of the head 138) to apply multiple tows in a particular course 142.

For example, the control signals cause the machine 104 to apply fiber tows of a first course 182 and a second course 184 to form a first ply 172 of the part 106. To illustrate, fiber tows corresponding to a first course 182 are applied to the mandrel from a start point 192 to an end point 194. The fiber tows may be steered along a non-geodesic path from the start point 192 to the end point 194 to form one or more curves 196. The one or more curves 196 include one or more inflections points 198 (e.g., a point on a particular curve of the one or more curves 196 where a steering direction/sign of the curvature of the particular curve changes). Fiber tows corresponding to a second course 184 are applied to the mandrel in a similar manner as described with reference to the first course 182. The control signals cause the machine 104 to apply fiber tows to form a second ply 174 of the part 106. The second ply 174 may be formed over (overlies) the first ply 172 and may be formed in a similar manner as described with reference to the first ply 172. The second ply 174 may include one or more courses and each of the courses may include one or more curves and one or more inflection points.

In some implementations, the first ply 172 and the second ply 174 have the same orientation (e.g., nominal ply orientation). For example, the first ply 172 and the second ply 174 are both 0 degree plies and have fibers (e.g., tows) orientated along a length of the part 106. However, the first ply 172 and the second ply 174 may include tows that are slightly misaligned from the nominal orientation due to steering the tows.

In some implementations, the commands 170 further cause the machine 104 to form one or more plies having the same orientation as the first ply or having a second orientation (e.g., nominal orientation) that is different from the orientation of the first ply. As an illustrative example, the machine 104 may form a 0 degree ply, followed by a +45 degree ply, followed by a 90 degree ply, followed by a −45 degree ply, etc. The one or more other plies of the part 106 may be formed as described herein. In some implementations, multiple plies of different orientations are interleaved between the first ply 172 and the second ply 174. The sequence and shapes of the multiple plies of different orientations forming the composite part may be designed to meet a desired level of structural performance.

In some implementations, the tool path application 124 calculates the edge length difference for a tow projection path using multiple edge length difference calculation methods, as described with reference to FIG. 8. In a particular implementation, the tool path application 124 calculates the edge length difference for each method iteratively. For example, the tool path application 124 calculates a first edge length difference using a first method and based on the first edge length difference satisfying the threshold, the tool path application 124 calculates a second edge length difference using a second method. If none of the methods satisfy the threshold, the computer 102 may output a notification or adjust one or more of the variables of the design or manufacturing process. Additionally, or alternatively, the tool path application 124 may calculate edge length differences using a direction (e.g., an application or layup direction) dependent method. For example, the tool path application 124 calculates a first edge length difference using a first application direction and calculates a second edge length difference using a second application direction. The tool path application 124 compares the first and second edge length differences to select an application direction with the lowest edge length difference.

The system 100 is capable of predicting and reducing or eliminating wrinkles and puckers in parts. By calculating the edge length difference and comparing the edge length difference to a threshold, deviations or anomalies may be predicted during the design process and before the part is manufactured. Using edge length difference accounts for cumulative steering effects and is more accurate than using local measurements (e.g., a steering radius). Thus, the deviations or anomalies are more accurately predicted and more deviations or anomalies may be reduced or eliminated before production of the part. Accordingly, parts produced by the system 100 require less rework. Conversely, part designs that may have previously been rejected based on local steering radius measures might be acceptable based on the new measure. Consequently, the part may be manufactured using a wider tow width, resulting in a higher (e.g., faster) layup rate. The reduction in rework or the increase in layup rate reduces costs and time associated with producing a part. Additionally, the part may have increased strength and stiffness properties as compared to parts made by conventional methods.

Figure 2:
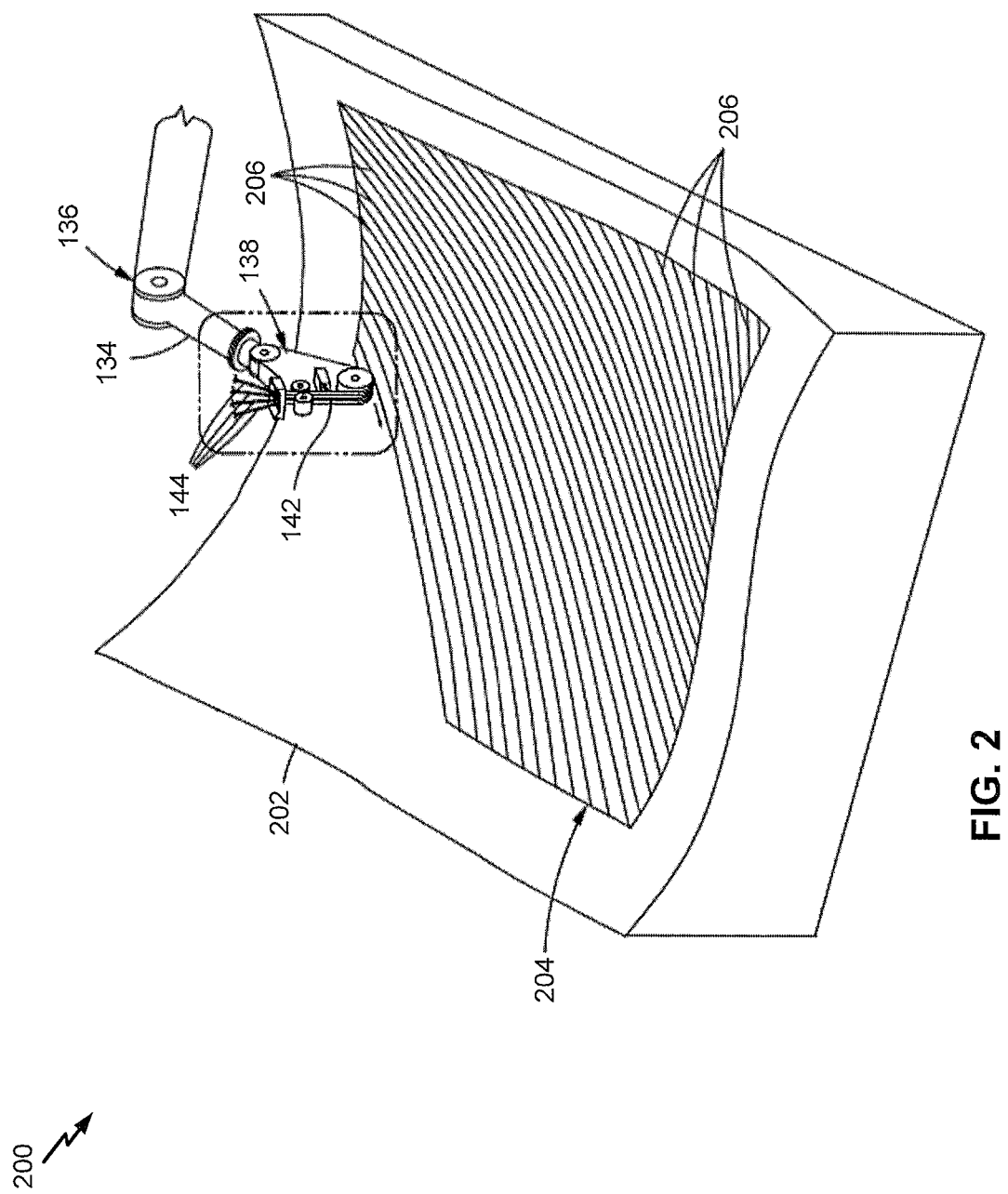
FIG. 2 is a diagram that illustrates an example of an automated fiber placement machine.

FIG. 2 is a diagram 200 that illustrates an example of an automated fiber placement machine, such as the machine 104 of FIG. 1. The diagram 200 illustrates the machine 104 applying a plurality of courses 206 on a layup surface 202 to form a ply 204. As illustrated in FIG. 2, the layup surface 202 is curved (e.g., has non-zero surface curvature and is non-planar). The layup surface 202 may include or correspond to a surface of a tool or mandrel, or the layup surface 202 may correspond to a surface that is formed after a number of plies has been deposited onto a tool surface. The machine 104 includes the head 138, which is moved and steered by the mechanical linkage 134 and the actuators 136. The head 138 applies multiple tows 144 to form the course 142.

Figure 3:
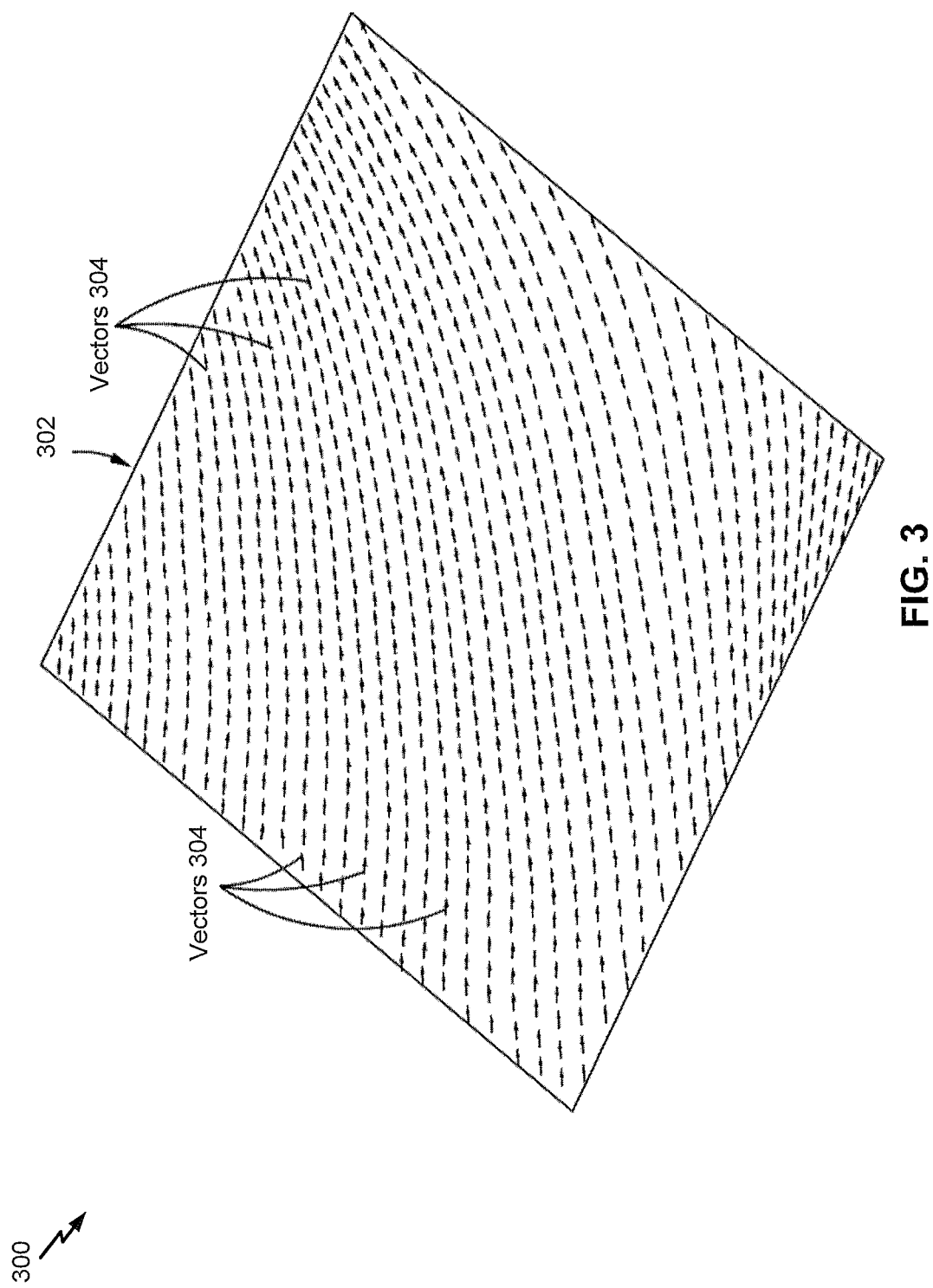
FIG. 3 is a diagram that illustrates an example of a vector field.

FIG. 3 is a diagram that depicts an example 300 of a vector field 302 included in or indicated by the vector field data 158 of FIG. 1. The vector field 302 includes a plurality of vectors 304 each corresponding to a point on a surface. The surface may include or correspond to a surface of the part 106 or to a surface of a ply thereof. The plurality of vectors 304 indicate a local orientation of fibers on the surface. The vector field 302 may be determined based on a projection of a 0 degree fiber orientation onto a surface of the part 106. The vector field 302 may be determined by the modeling software 122 or the tool path application 124 of FIG. 1.

FIG. 4 depicts a diagram 400 that illustrates an example of a plurality of rollers 402 of the head 138 of the machine 104 of FIG. 1. As described with reference to FIG. 1, the head 138 may have a single roller in other implementations. The head 138 of the machine 104 is configured to follow a programmed path (e.g., a tool path) based on a fiber orientation from a design file or a geometry file. The programmed path includes or corresponds to a middle of the first course 182 (if all tows would be applied) and is referred to as a course centerline 418.

A direction that the head 138 of the machine 104 follows along a surface tangent to the course centerline 418 is defined as a course direction 412. The course direction 412 lies in a plane that is tangent to the surface. A head direction 414 is orthogonal to the course direction 412 and is defined by rotational axes of the plurality of rollers 402 of the head 138. The head direction 414 may or may not lay in the plane that is tangent to the surface. A head normal direction 416 is a direction that is orthogonal to the course direction 412 and the head direction 414.

The plurality of rollers 402 are configured to extract or apply the tows 422 along tow roller surfaces 424 (e.g., tow roller paths or tow application paths). The head 138 is configured to turn the plurality of rollers 402 to follow the course centerline 418. The head 138 of the machine 104 is configured to apply a force in the head normal direction 416 to maintain contact between the plurality of rollers 402 and the layup surface (e.g., the tool or part surface). On curved surfaces, the plurality of rollers 402 may displace (e.g., move up and down) along the head normal direction 416 to maintain contact with and conform to the layup surface. If the roller surface is not flush with the layup surface, the plurality of rollers 402 also needs to deform (conform to surface geometry) to maintain contact between the plurality of rollers 402 and the layup surface (e.g., the tool or part surface).

A bottom of each of the rollers 402 traces out ribbon-like surfaces as the head 138 moves along the course centerline 418 as if the rollers 402 were rigid and contacting the layup surface (e.g., the tool or part surface). These ribbons, which are developable surfaces, are referred to as the tow roller surfaces 424 (e.g., initial tow surfaces). A developable surface is a smooth surface with zero Gaussian curvature and can be flattened onto a plane without distortion (i.e. "stretching" or "compressing"). The tow roller surfaces 424 include or correspond to two-dimensional geometric entities. A projection of a tow roller surface 424 in the head normal direction 416 is referred to as a tow projection 426 (e.g., a tow projection path). If each of the plurality of rollers 402 deforms enough to conform to the layup surface, the plurality of rollers 402 will push the tows 422 such that the tows 422 lie somewhere within the tow projections 426 (on the layup surface). Since the width of the tow projections 426 is greater than or equal to the width of the tows 422, gaps between the tows 422 may occur if the tow width does not expand due to deformation.

FIG. 5 is a diagram 500 that illustrates an example of a portion of a course 502 applied by an automated fiber placement machine, such as the machine 104 of FIG. 1, onto a layup surface. In FIG. 5, the course 502 is applied to a cone 512. The surface of the cone 512 may include or correspond to the layup surface, and the cone 512 may include or correspond to a tool or mandrel used as a basis for forming the part 106 of FIG. 1.

The diagram 500 illustrates an enlarged view of the course 502 that is applied to the cone 512. The course centerline 418, the head direction 414, and the head normal direction 416 are illustrated for the course 502. A tow width 522 ($w$) and a tow offset distance 524 (mw) are illustrated as offsets in the head direction 414 in the diagram 500, where m indicates a tow index number from the course centerline 418. In the diagram 500, the tow roller surfaces 424 and the tow projections 426 are illustrated. A distance measured in the head normal direction 416 relative to the centerline point (e.g., vertical distance as illustrated in FIG. 5) between the tow projections 426 and the tow roller surfaces 424 is referred to as a signed distance 526 ($d_m$).

In some implementations, determining the tow projections 426 based on the tow roller surfaces 424 include computing projected tow path surfaces by computing a projection of the initial tow path surface in the head normal direction 416. To illustrate, boundary edges of the projected tow path surfaces are determined by projecting boundary edges of the tow roller surfaces 424 in the head normal direction 416 onto the layup surface (e.g., the surface of the cone 512.

In other implementations, determining the tow projections 426 based on the tow roller surfaces 424 includes simulating or modelling application of tows draped onto the layup surface. For example, the modeling software 122 of FIG. 1 may perform computations to simulate application of the tows to determine the tow projections 426 (e.g., the boundary edges of the projected tow path surfaces).

Figure 6:
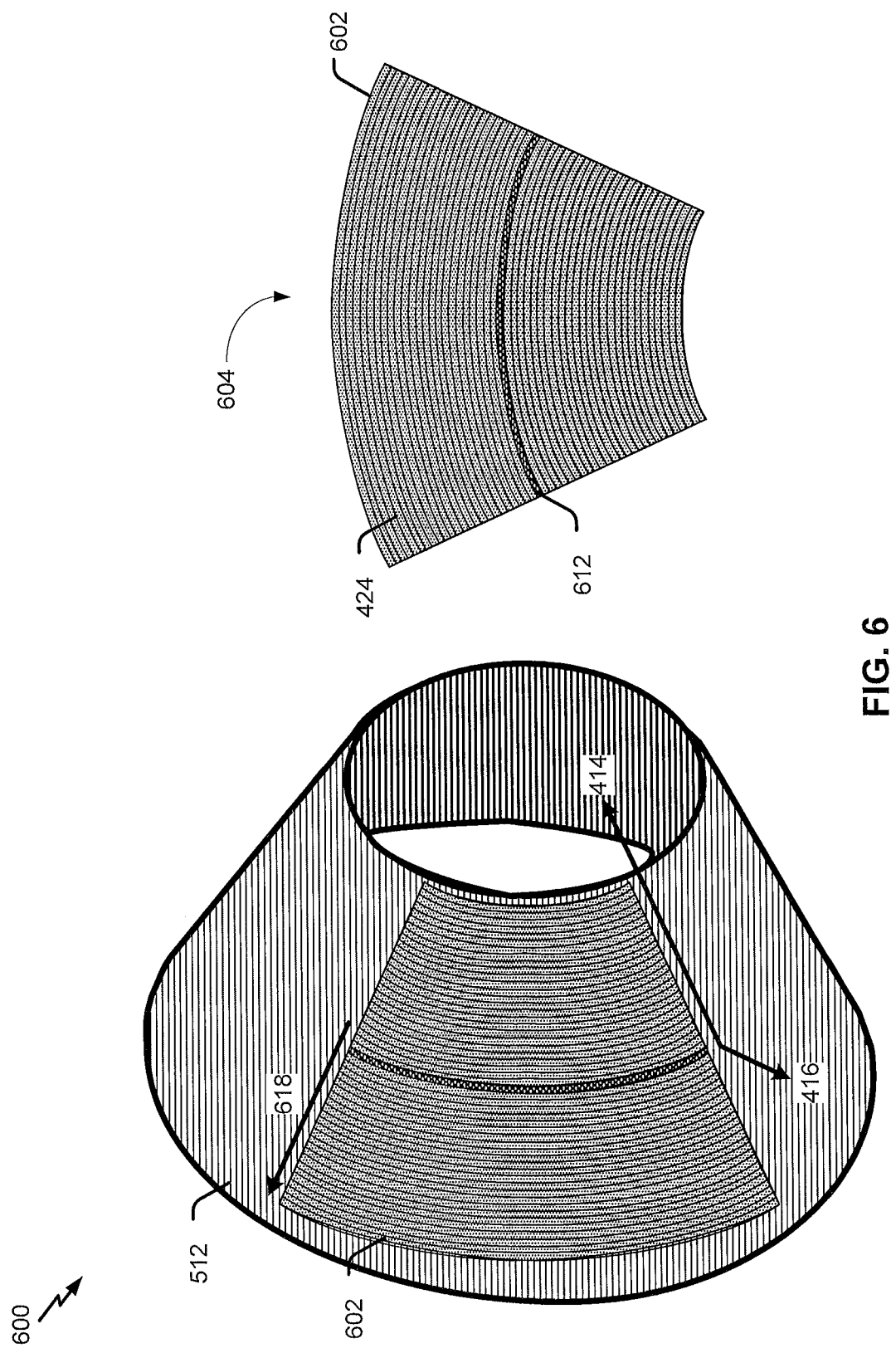
FIG. 6 is a diagram that illustrates another example of a course applied by an automated fiber placement machine onto a layup surface.

FIG. 6 is a diagram 600 that illustrates another example of a portion of a course applied by an automated fiber placement machine, such as the machine 104 of FIG. 1, onto a layup surface. In FIG. 6, a developable course 602 is applied to the cone 512. As compared to the course 502 of FIG. 5, the signed offset $d_m$ of developable course 602 is zero (e.g., the tow roller surfaces are the same as the tow projections 426 (not illustrated)). A center tow 612, the head normal direction 416, and the head direction 414 are illustrated for reference. In FIG. 6, the head normal direction 416 for each point of the course is the same as a surface normal of the surface of the cone 512 at that point.

The diagram 600 illustrates an enlarged representation 604 of the developable course 602. The enlarged representation 604 illustrates isometric flattening of the tows of the developable course 602 and a planar layup. A planar layup satisfies the following conditions, a tool/part surface is developable, a course direction is orthogonal to a developed direction 618 on the surface of the cone 512 (e.g., the part surface), and the head normal direction is assumed to be aligned with the surface normal.

For a planar layup (e.g., flat geometry), two neighboring tow roller surfaces 424 share an edge (e.g., an edge boundary) and the edge boundary curves of the tow projections are the same as the edge boundary curves of the tow roller surfaces 424 because the tow roller surfaces 424 are already on the layup surface (e.g., the surface of the cone 512). Even though the developable course 602 is applied on the three dimensional surface of the cone 512, as illustrated in FIG. 6, the developed or flattened course can be used to perform the edge length calculations, because the surface is developable (e.g., a distance and angle preserving isometric flattening of the developable course 602 exists). For a planar layup (e.g., flat geometry), determining the tow projections 426 based on the tow roller surfaces 424 includes determining the tow roller surfaces 424 and using the tow roller surfaces 424 as the tow projections 426.

Figure 7:
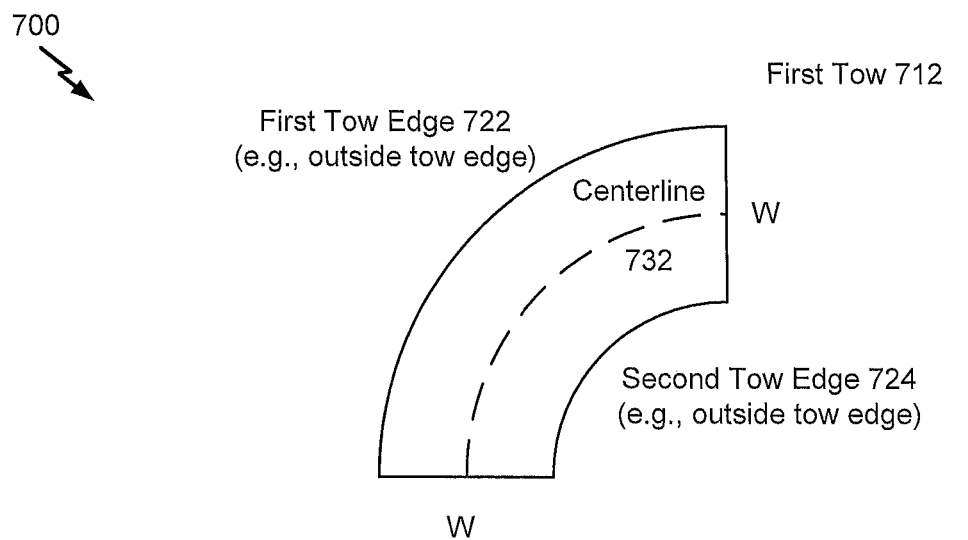
FIG. 7 is a diagram that illustrates an example of an edge length differences of tows.
Figure 7:
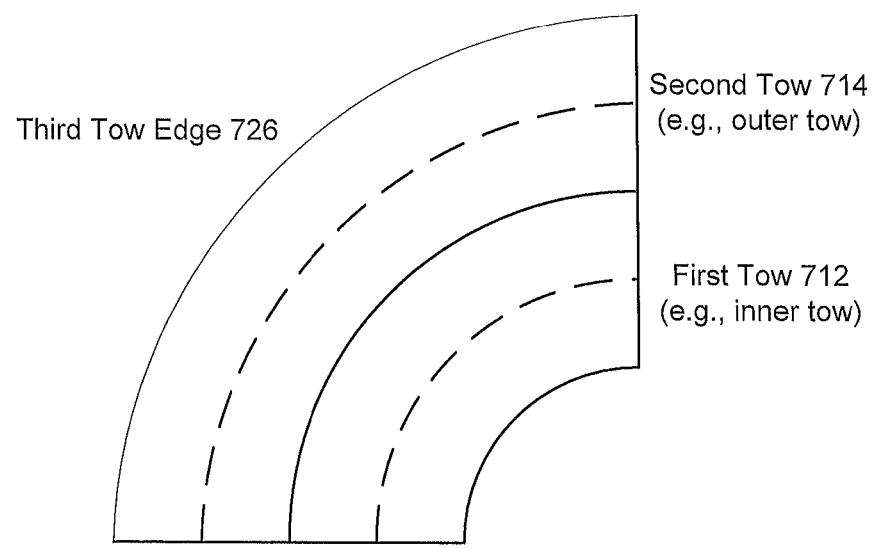

FIG. 7 is a diagram 700 that illustrates an example of edge length differences of tows. In FIG. 7, a first tow 712 is steered along a centerline 732 and the first tow 712 has a tow width ($w$). The first tow 712 has a first tow edge 722 and a second tow edge 724. The first tow edge 722 has a first edge length 742 and the second tow edge has a second edge length 744, and the edge lengths 742 and 744 are illustrated as straight lines in FIG. 7 to illustrate their respective lengths. The first edge length 742 is approximately twice the length of the second edge length 744. An edge length difference 752 (e.g., an edge length delta) is determined by subtracting the second edge length 744 from the first edge length 742 and is illustrated in dashed lines in FIG. 7. In some implementations, the edge length difference 752 is adjusted based on a relaxation factor, as described with reference to FIG. 8. The relaxation factor corrects for a difference in a projected edge length difference (e.g., the edge length difference 752) and an actual edge length difference that accounts for edge length difference reductions from one or more sources, such as tow material stretching or undulating on a micro scale.

FIG. 7 also illustrates that when multiple tows 712 and 714 are applied, the tows 712 and 714 may have the same edge length difference. For example, the edge length difference 752 for first tow 712 is the same as a second edge length difference (a third edge length 746 of a third tow edge 726 minus the first edge length 742 of the first tow edge 722) for the second tow 714. This condition is true for planar or flat parts (e.g., developable courses). For curved layups (e.g., non-developable courses), each tow of the course may have a different edge length difference.

FIG. 8 is a diagram 800 that illustrates example edge length difference calculations for start and end points. In FIG. 8, a representation 802 of exemplary curved course centerlines of the first course 182 and the second course 184 are illustrated in dashed lines. Additionally, tow edge boundaries 804 for a plurality of tows of a portion (point A to point E) of the first course 182 and the second course 184 are illustrated (with the course centerline in dashed lines). The diagram 800 illustrates multiple points, A, B, C, D, E, and Z. The multiple points may include or correspond to start or end points for edge length difference calculations. The diagram 800 also illustrates a normal vector (N) of the tows, a tangent vector (T) of the tows, and the head direction 414 ($h$). A curvature of the portion of the courses 182 and 184 illustrated in FIG. 8 is positive (h=−N) from point A to point C and negative (h=N) from point C to point E.

There are multiple methods for choosing start points and end points when determining edge length differences to account for cumulative effects of steering along a course. Evaluating a curvature along a course to account for cumulative effects of steering along a course may include using start and end points from multiple different methods. For example, a computer may determine edge length differences for a curvature of a course/tow using start and end points from each of the multiple methods. If any of the edge length differences fail to satisfy a threshold (or a corresponding threshold), one or more variables of the production process may be adjusted as described with reference to FIG. 1.

A first method involves determining an edge length difference along the entire course length (i.e., from point A to point Z). The first method involves integrating a curvature of a course/tow from a start point A to an end point Z. The first method is the least computationally intensive. The first method provides an accurate representative when a sign (or direction) of the curvature of the curve does not change along the length of the tow (e.g., when there are no inflection points). However, if the sign of the curvature (e.g., a direction of steering) changes the edge length difference of the projected tow path surface could be zero when measured over the entire length, but the projected tow path surface may contain portions that have an edge length difference that exceeds the threshold (e.g., steering limit).

A second method involves determining an edge length difference for one or more particular portions of the courses 182 and 184, between two inflection points (e.g., points A, C, and E as illustrated in FIG. 8). The second method involves integrating the curvature of the course/tow from a start point A to an end point C or from a start point C to an end point E. The second method is a conservative approach that measures an edge length difference along segments of the curve where the sign of the curvature does not change. The edge length difference of the second method does not account for any advantage from any steering in the opposite direction (which is in contrast to the first method).

The first method and the second method are direction independent methods. For example, switching the starting point and ending point would yield the same result for the first and second methods. The direction independent methods provide a total edge length difference. Methods three, four, and five are direction dependent methods. The direction independent methods (e.g., the first method and the second method) have a computational advantage (e.g., use fewer computations) as compared to the direction dependent methods. However, edge length differences of the direction independent methods do not provide any information about how the edge length difference develops along the layup surface (e.g., edge length difference values at intervals along the layup surface) and do not provide any information about the application direction of the course.

The third method involves determining an edge length difference as a function of completed arc length. The third method involves integrating the curvature of the course/tow from a start point A to an end point Z* (integrating cumulatively from the start point A to each point from point A to point Z), or vice versa (e.g., from Z to A*). The advantages of the third method are that computing the edge length difference as a function of location will identify any instances of large edge length differences that exceed the threshold along the curvature. For example, the third method may identify point C as having a large edge length difference, while the first method may return an edge length difference of zero. A disadvantage of the third method is that opposite steering is still accounted for even if the opposite steering happened far away from the location and that puckers and relaxation may have already mitigated any opposite edge length differences (from the opposite steering) while the course was going straight. A feature of the third method is that two edge length differences are determined to represent the two possible application directions (e.g., a direction in which the tows are applied), because the application direction may not be consistent between courses within the same ply and may be unknown at the moment that the part is evaluated. An application direction may be determined based on the edge length differential measurements. For example, an edge length difference may exceed the threshold for one application direction, whereas the edge length difference for the second application direction may not exceed the threshold. The second application direction may be used to generate the part.

The fourth method involves determining an edge length difference as a function of completed arc length starting from an inflection point or between two inflections points. The fourth method involves integrating the curvature of the course/tow cumulatively from a first inflection point to each point from the first inflection point to an end point. In some implementations, both the start points and end points are inflection points. The advantage of this method is that it shows the edge length difference as a function of location, and that it does not assume credit for any opposite steering that may have happened earlier in the course (e.g., happened prior to the last inflection point past). The fourth method produces a conservative edge length difference because it does not account for opposite steering even if the opposite steering was in close proximity. Similar to the third method, two edge length differences are determined to represent the two possible application directions.

The fifth method (e.g., a fixed window method) involves determining an edge length difference for a fixed length interval ($\Delta s$) as a function of location along the path (s). The fifth method involves cumulatively integrating the curvature of the course/tow from a start point $s^*-0.5\Delta s$ to an end point $s^*+0.5\Delta s$, where s is a point on the course centerline. For example, for a starting point B, the fifth method involves cumulatively integrating the curvature of the course/tow from point A to point C* or vice versa (e.g., from C to A*). As another example, for a location C, the fifth method involves cumulatively integrating the curvature of the course/tow from points B to D*, D to B*, A to E*, or E to A* depending on a length of the fixed interval. An advantage of the fifth method is that more of the relaxation mechanisms, such as pucker formation, are accounted for which could either favorably or negatively affect the edge length difference. For example, as compared to the fourth method, the fifth method accounts for opposite steering that is in close proximity to the location even if the opposite steering happened prior to an inflection point.

Different window sizes (e.g., Δs) may be used for different course centerline curvatures. Although the fixed length interval is centered around a particular point, in other implementations, the fixed length interval may be biased toward either direction to represent the application direction. Similar to the third method and the fourth method, two edge length differences are determined to represent the two possible application directions.

A relaxation factor may be applied to any of the methods. The relaxation factor accounts for any puckering or relaxation that occurs during application of the course. Conceptually, a relaxed or actual edge length difference $\delta_r$ includes an accumulation of the edge length difference (without relaxation) $\delta$ that is caused by steering and the three-dimensional layup surface but is reduced due to relaxation effects. An amount of relaxation will depend on material properties of the tows, process settings, and an amount of accumulated edge length difference. The amount of accumulated edge length difference introduces internal stresses in the tow, which will act to reduce the accumulated edge length difference. An example equation for the relaxed edge length difference where a step (from i to i+1) along the tow centerline over a distance Δs is: $\delta_r(i+1)=\delta_r(i)-r(\delta_r(i))\cdot\delta_r(i)+(\delta(i+1)-\delta(i))$.

A first term $\delta_r(i)$ represents the edge length difference already present in the tow. A second term $r(\delta_r(i))-\delta_r(i)$ represents the reduction in edge length difference due to relaxation, and a third term $(\delta(i+1)-\delta(i))$ represents the change in edge length difference due to steering and surface contour over the length of the interval Δs. A relaxation function $r(\delta_r)$ will always have a positive value smaller than one and is based on physical conditions of the application of the tows. When r=0 no relaxation occurs and $\delta_r=\delta$.

Figure 9:
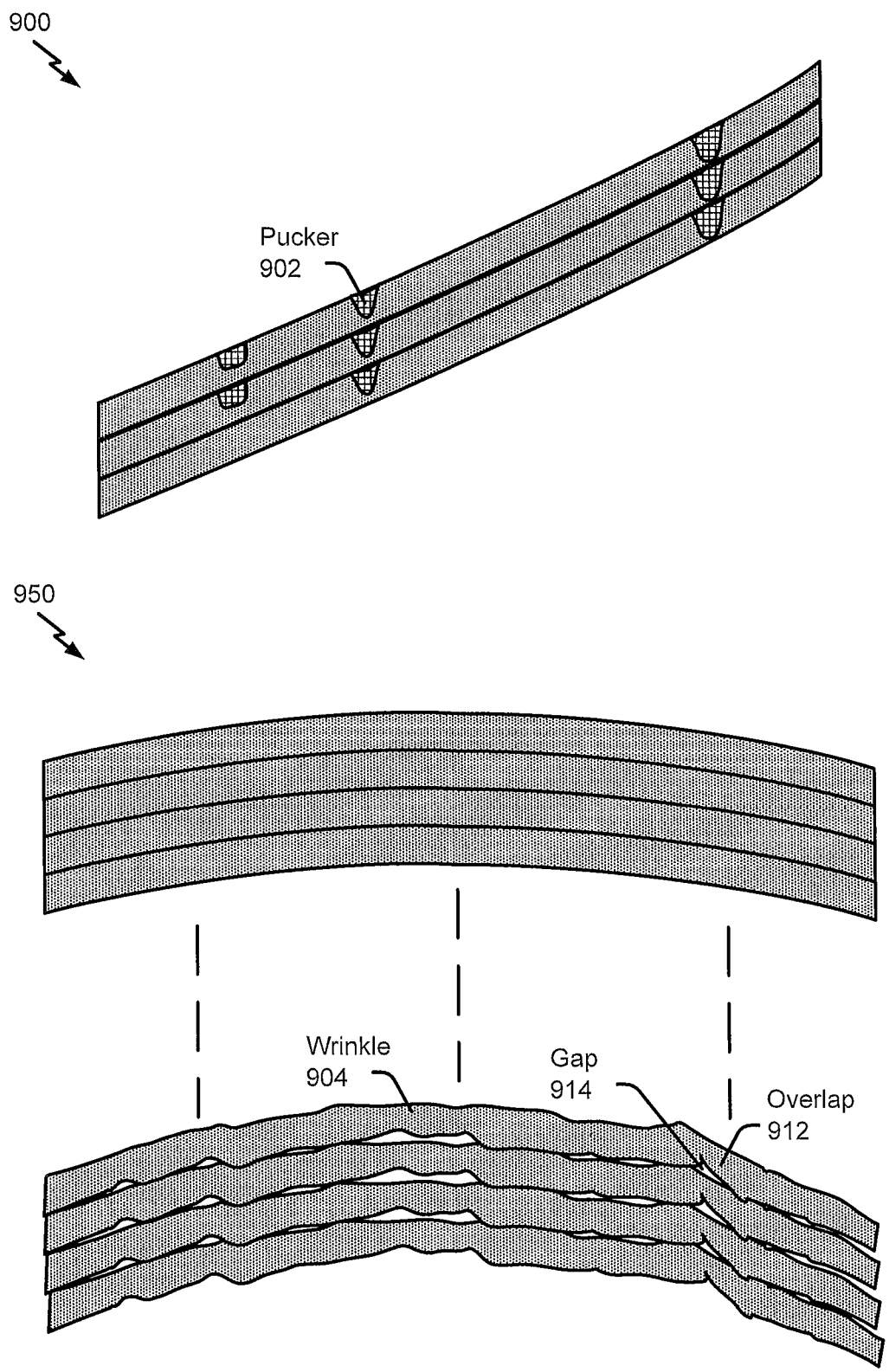
FIG. 9 is a diagram that illustrates deviations and anomalies that occur when steering tows without accounting for edge length differences.

FIG. 9 illustrates diagrams 900 and 950 that depicts deviations or anomalies that may occur during steering a course. When a tow is started it is fed to a layup surface, until the tow is captured between a roller and the layup surface, after which a tow feed mechanism is disengaged and the tow is dispensed based on a longest distance any point of the roller travels. Accordingly, a surplus of material will be supplied if the tow is steered. This surplus material can start forming puckers 902 or wrinkles 904, as shown in FIG. 9.

The diagram 900 illustrates the puckers 902 forming in the tow material. The puckers 902 form at locations along the tow where the adhesive forces between the tow and the underlying layup surface were insufficient to prevent the tow from buckling. The puckers 902 tend to relieve some of the edge length difference that builds up in the tow. As illustrated in FIG. 9, the puckers 902 may form in similar areas depending on geometries of the layup surface and the tow path surfaces.

The diagram 950 illustrates the wrinkles 904 forming in the tow material. The wrinkles 904 occur when excess tow material exceeds a threshold and the roller pushes the edge of the tow over onto itself.

In some implementations, a design that satisfies the equation $1/|\kappa|>0.5n_t w$ locally (e.g., at a particular point) will not produce the puckers 902 or the wrinkles 904 at the particular point, where K is a signed curvature, $n_t$ is number of tows, and w is tow width. The equation represents a condition that an absolute value of a steering radius is greater than half of the total course width. The condition may prevent or reduce a tow edge from folding onto itself.

Additionally, the excess material built up due to an edge length difference may be negated if the direction of steering is reversed somewhere along the course, such that an S-shaped curve is formed, or the edge length difference may be reduced if the course goes straight for a while (e.g., relaxation of the tow material negates a portion of the projected edge length difference).

Figure 10:
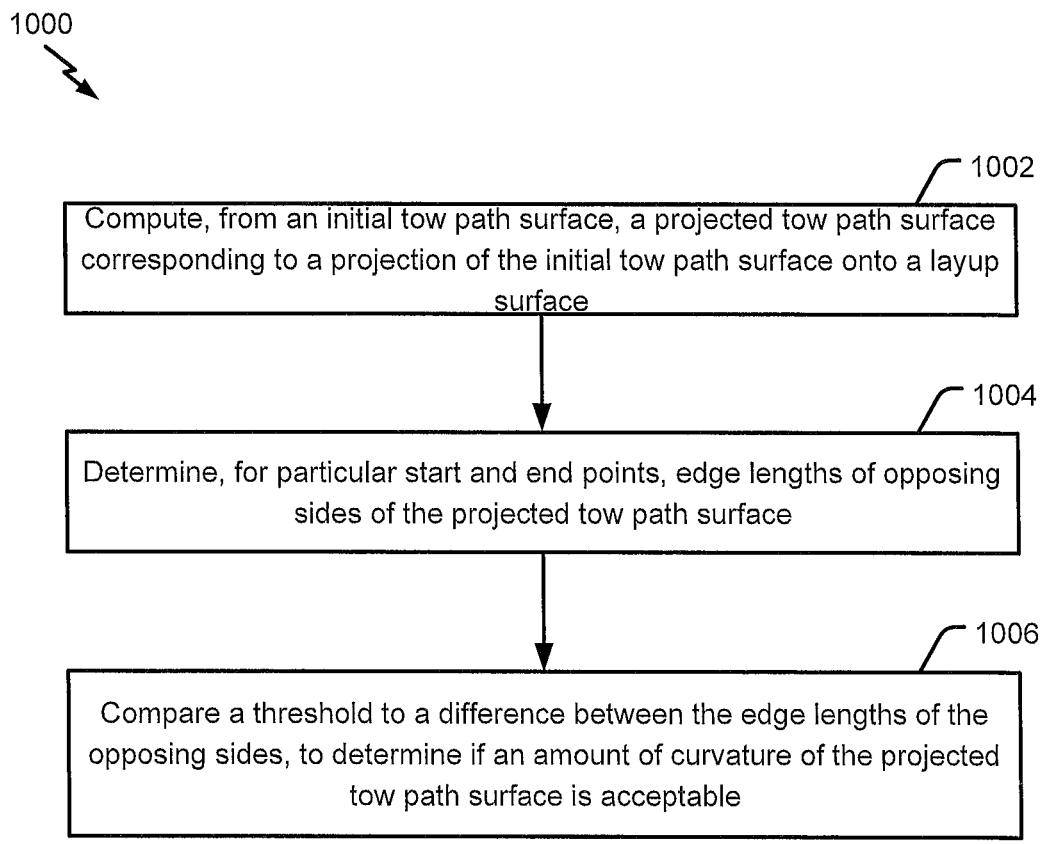
FIG. 10 is a flow chart of an example of a method of determining tow path surfaces associated with manufacturing a composite ply.

FIG. 10 is a flowchart of a method 1000 of determining tow path surfaces associated with manufacturing a composite ply. The method 1000 may be performed by the system 100, the computer 102, the machine 104, the tool path application 124 of FIG. 1, or a combination thereof. The method 1000 includes, at 1002, computing, from an initial tow path surface, a projected tow path surface corresponding to a projection of the initial tow path surface onto a layup surface. For example, the tool path application 124 computes the tow projection data 164 including one or more tow path surface projections, such as the tow projections 426 of FIG. 4, based on the tow application data 162. To illustrate, edges of the tow roller surfaces may be projected in the head normal direction 416 to a layup surface to determine edges of the tow projections 426. As another illustration, the computer 102 performs a tow draping simulation to determine edges of the tow projections 426. As yet another illustration, when the initial tow path surface is part of a developable course, such as the developable course 602 of FIG. 6, the initial tow path surface and the projected tow path surface share the same edges. The initial tow path surface includes or corresponds to a two-dimensional geometric entity.

The method 1000 of FIG. 10 also includes, at 1004, determining, for particular start and end points, edge lengths of opposing sides of the projected tow path surface. For example, the tool path application 124 determines the edge lengths of the projected tow path surface (a particular tow projection of the tow projections 426) by integrating a curvature of the projected tow path surface from the start point to the end point, as described with reference to FIGS. 1 and 8. The start and end points may include or correspond to the points A-Z of FIG. 8.

The method 1000 of FIG. 10 includes, at 1006, comparing a difference between the edge lengths of the opposing sides to a threshold, to determine if an amount of curvature along the projected tow path surface is acceptable. For example, the tool path application 124 may compute or select the threshold based on the threshold data 168 and compare the edge length difference to the threshold to determine if an amount of curvature along the projected tow path surface is acceptable, as described with reference to FIGS. 1, 7, and 8. The edge length difference may include or correspond to the edge length difference 752 of FIG. 7 (e.g., a projected edge length difference) or an actual edge length difference $\delta_r$, such as the edge length difference 752 after the relaxation factor has been applied.

In some implementations, the method 1000 further includes determining a vector field based on a projection of a 0 degree fiber orientation onto a surface of a part. For example, the vector field data 158 is generated based on the part data 156, as described with reference to FIG. 1. The method 1000 includes determining one or more course centerlines based on the vector field. For example, the course centerline data 160 is generated based on the vector field data 158, as described with reference to FIG. 1. The method 1000 includes determining the initial tow path surface based on a particular centerline of the one or more course centerlines and a head normal direction for a fiber placement head. For example, the tow application data 162 is generated based on the course centerline data 160, as described with reference to FIG. 1. The initial tow path surface may include or correspond to a particular tow roller surface of the tow roller surfaces 424 (e.g., the tow roller paths or tow application paths).

In some implementations, the method 1000 further includes determining a head model based on one or more course centerlines and head normal directions for a fiber placement head. Determining the head model may include determining a plurality of initial tow path surfaces, including the initial tow path surface, based on the one or more course centerlines, a count of tows, and a tow width. For example, the tow application data 162 is generated based on the course centerline data 160, the count of tows of the head 138, and width of the tows 144, as described with reference to FIG. 1. Determining the head model may further include computing a plurality of projected tow path surfaces, including the projected tow path surface, based on the plurality of initial tow path surfaces.

In some implementations, computing the projected tow path surface or paths includes computing a projection in a direction orthogonal to a direction of the initial tow path surface and orthogonal to an axis of rotation of rollers of a head of an automated fiber placement machine, as described with reference to FIG. 5. In other implementations, computing the projected tow path surface includes computing a simulation of an applied tow that is draped onto the layup surface, as described with reference to FIG. 5. The modeling software 122 of FIG. 1 may perform the simulation.

In some implementations, the method 1000 further includes computing boundary edges of the projected tow path surface by projecting edges of a tow roller surface of the initial tow path surface in a head normal direction onto the layup surface, as described with reference to FIG. 5. The start and end points may correspond to start and end points of a course, to inflections points of a curve of the course, a portion of the course, or a combination thereof, as described with reference to FIG. 8. In some implementations, the layup surface corresponds to a surface of a tool mandrel.

In some implementations, the method 1000 further includes determining the threshold based on a tow width of the initial tow path surface, a tow material, or a combination thereof. For example, the tool path application 124 computes the threshold based on the threshold data 168. As another example, the tool path application 124 selects or retrieves the threshold from a data table of the threshold data 168 using the tow width, the tow material, or both, as inputs. The method 1000 may also include generating, based on comparing the difference in the edge lengths to the threshold, an output indicating whether the amount of curvature along the projected tow path surface is acceptable. For example, the computer 102 may generate a notification for display on a display device. The notification may indicate that the amount of curvature along the projected tow path surface is acceptable or not acceptable. The notification may further include or indicate a recommendation to adjust the fiber placement process (e.g., decrease or increase a tow width, change a tow material, etc.).

In some implementations, upon a determination that the amount of curvature along the projected tow path surface is acceptable, the method 1000 further includes generating a plurality of tool paths based on a plurality of course centerlines. For example, the tool path application 124 generates tool paths based on the course centerline data 160 and generates the commands 170 based on the tool paths. The method 1000 may also include outputting data indicating the tool paths, the data indicating the tool paths configured to instruct an automated fiber placement machine to apply courses according to the tool paths. For example, the computer 102 may output the commands 170 to the machine 104. The machine 104 may form the part 106 based on the commands 170. In some implementations, the commands 170 are included in a geometry file or a design file.

In some implementations, upon a determination that the amount of curvature along the projected tow path surface is acceptable, the method 1000 further includes increasing a width of the tow to be applied to the layup surface to an adjusted tow width. The method 1000 also includes determining an adjusted initial tow path surface based on the adjusted tow width. The method 1000 includes computing, from the adjusted initial tow path surface, an adjusted projected tow path surface corresponding to a projection of the adjusted initial tow path surface onto the layup surface. For example, increasing the tow width adjusts the initial tow path surfaces and the projected tow path surfaces. The method 1000 also includes determining, for the start and end points, adjusted edge lengths of the opposing sides of the adjusted projected tow path surface. For example, increasing the tow width may increase the edge length difference. The method 1000 includes comparing a second difference between the adjusted edge lengths of the opposing sides to a second threshold, to determine if the amount of curvature of the adjusted projected tow path surface is acceptable. The second threshold may be determined based on the adjusted tow width.

In some implementations, upon a determination that the amount of curvature along the projected tow path surface is not acceptable, the method 1000 further includes adjusting a course centerline to change a curvature of the initial tow path surface to generate an adjusted initial tow path surface. For example, the curvature of a course centerline may be reduced which may result in an increase of the steering radius (e.g. a reduction of the curvature) of the projected tow path surface. The method 1000 includes computing, from the adjusted initial tow path surface, an adjusted projected tow path surface corresponding to a projection of the adjusted initial tow path surface onto the layup surface. The method 1000 also includes determining, for the start and end points, adjusted edge lengths of the opposing sides of the adjusted projected tow path surface. The method 1000 includes comparing a second difference between the adjusted edge lengths of the opposing sides to the threshold, to determine if the amount of curvature of the adjusted projected tow path surface is acceptable.

In some implementations, upon a determination that the amount of curvature along the projected tow path surface is not acceptable, the method 1000 further includes adjusting a curvature of the layup surface. The layup surface may include or correspond to the layup surface 202 of FIG. 2. Adjusting a curvature of the layup surface adjusts the edge lengths of the projected tow path surface. For example, the curvature of the layup surface may be softened, such as less concave or convex, resulting in an increase of the steering radius (e.g. a reduction of the curvature) of the projected tow path surface. The method 1000 also includes comparing a second difference between adjusted edge lengths of the opposing sides to the threshold, to determine if the amount of curvature of the adjusted projected tow path surface is acceptable.

In some implementations, upon a determination that the amount of curvature along the projected tow path surface is not acceptable, the method 1000 further includes reducing a width of the tow to be applied to the layup surface to result in a reduced difference in edge length. Reducing the width of the tow adjusts the edge lengths of the projected tow path surface. For example, decreasing the tow width adjusts the initial tow path surfaces and the projected tow path surfaces and decreases the edge length difference. The method 1000 also includes comparing a second difference between adjusted edge lengths of the opposing sides to a second threshold, to determine if the amount of curvature along the adjusted projected tow path surface is acceptable. The second threshold may be determined based on the adjusted tow width.

In some implementations, upon a determination that the amount of curvature along the projected tow path surface is not acceptable, the method 1000 further includes changing a material of the tows to be applied to the layup surface. Changing the material of the tows adjusts the edge lengths of the projected tow path surface, adjusts a relaxation factor, or both. For example, the changed material of the tows may have a different relaxation factor that decreases the edge length difference when a draping model is used (e.g., a tow application simulation is performed). The method 1000 includes determining a second difference based on the adjusted edge lengths, the adjusted relaxation factor, or both. The method 1000 also includes comparing the second difference to a second threshold, to determine if the amount of curvature along the projected tow path surface is acceptable. The second threshold includes or corresponds to the changed material of the tows In some implementations, upon a determination that the amount of curvature along the projected tow path surface not is acceptable, the method 1000 further includes adjusting an expected level of structural performance of a part associated with the projected tow path surface. For example, the computer 102 may reduce a load rating or a stiffness rating of the part 106 responsive to the edge length difference failing to satisfy the threshold.

In some implementations, the method 1000 further includes comparing one-half of a total course width to a curvature at each point along a course centerline corresponding to the initial tow path surface to determine if a tow edge will fold during application, as described with reference to FIG. 9.

In some implementations, the method 1000 further includes determining the difference between the edge lengths of the opposing sides by calculating a first edge length for a first boundary edge of the tow projection and calculating a second edge length for a second boundary edge of the tow projection. For example, the first edge length and the second edge length may include or correspond to the edge lengths 722-726 of FIG. 7. The method 1000 also includes subtracting the second edge length from the first edge length to determine a projected difference between the edge lengths of the opposing sides. For example, the projected difference may include or correspond to the (projected) edge length difference 752 generated by subtracting the second edge length 744 from the first edge length 742. The method 1000 includes reducing the projected difference by a relaxation factor to determine the difference between the edge lengths of the opposing sides. For example, the difference between the edge lengths of the opposing sides may include or correspond to the projected edge length difference 752 reduced by the relaxation factor. The relaxation factor may be based on material properties of a tow material, process settings, an accumulated amount of edge length difference, or a combination thereof, as described with reference to FIG. 8.

In some implementations, the method 1000 further includes determining, for second start and end points, second edge lengths of the opposing sides of the projected tow path surface. For example, the computer 102 may determine multiple edge length differences for a course or for individual tows thereof, as described with reference to FIG. 8. The second start and end points may include or correspond to the points A-Z of FIG. 8. The method 1000 may also include comparing a second difference between the second edge lengths of the opposing sides to the threshold, to determine if the amount of curvature along the projected tow path surface is acceptable, as described with reference to FIGS. 1 and 8. In other implementations, a second threshold may be applied to the second difference.

In some implementations, the method 1000 further includes computing, from a second initial tow path surface, a second projected tow path surface corresponding to a projection of the second initial tow path surface onto the layup surface. The method 1000 may also include determining, for particular second start and end points, second edge lengths of opposing sides of the second projected tow path surface. The method 1000 may include determining a second difference between the second edge lengths of the opposing sides, to determine if an amount of curvature along the second projected tow path surface is acceptable. The difference corresponds to a first application direction and the second difference corresponds to a second application direction. The method 1000 may further include selecting the first application direction or the second application direction based on the difference, the second difference, and the threshold. For example, the second difference may be compared to the threshold, the difference, or both. In a particular implementation, the second difference is compared to the difference based on the difference and the second difference both satisfying (e.g., being less than) the threshold. In other implementations, the method 1000 does not include selecting either application direction. For example, when the difference and the second difference fail to satisfy the threshold, one or more variables of the production process are adjusted or performance characteristics of the part are reduced.

The method 1000 may also include or correspond to a method for predicting wrinkles and puckers when steering tows or a method for optimizing (e.g., maximizing) tow width without generating (e.g., while preventing) wrinkles or puckering.

Figure 11:
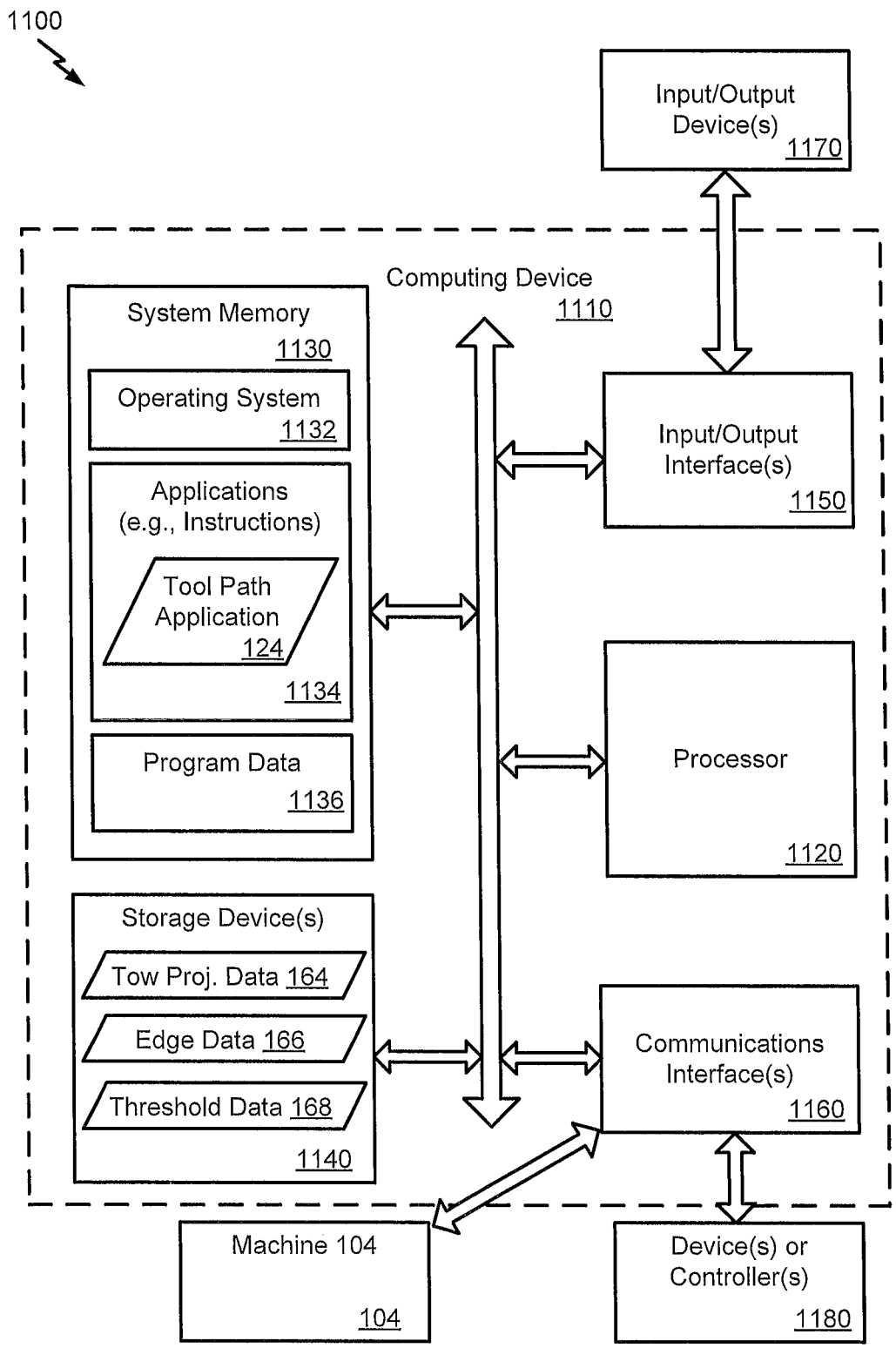
FIG. 11 is an illustration of a block diagram of a computing environment including a general purpose computing device configured to determining tow path surfaces associated with manufacturing a composite ply according to the present disclosure.

FIG. 11 is an illustration of a block diagram of a computing environment 1100 including a general purpose computing device 1110 configured to support embodiments of computer-implemented methods and computer-executable program instructions (or code) according to the present disclosure. For example, the computing device 1110, or portions thereof, may execute instructions to perform the functions of the system 100 or functions of a portion of the system 100, such as the processor 112 or the processor 152. The instructions to control the system 100 (or a portion of the system 100, such as the processor 112 or the processor 152) may include instructions to cause the processor to compute, from an initial tow path surface, a projected tow path surface corresponding to a projection of the initial tow path surface onto a layup surface. The instructions further cause the processor to determine, for particular start and end points, edge lengths of opposing sides of the projected tow path surface. The instructions further cause the processor to compare a difference between the edge lengths of the opposing sides to a threshold, to determine if an amount of curvature along the projected tow path surface is acceptable. The computing device 1110, or portions thereof, may further execute instructions according to any of the methods described herein, or to enable any of the methods described herein, such as the method 1000 of FIG. 10.

The computing device 1110 may include a processor 1120. The processor 1120 may communicate with the system memory 1130, one or more storage devices 1140, one or more input/output interfaces 1150, one or more communications interfaces 1160, or a combination thereof. In a particular embodiment, the processor 1120 includes or corresponds to the processor 112 or the processor 152. The system memory 1130 may include volatile memory devices (e.g., random access memory (RAM) devices), nonvolatile memory devices (e.g., read-only memory (ROM) devices, programmable read-only memory, and flash memory), or both. The system memory 1130 may include an operating system 1132, which may include a basic/input output system for booting the computing device 1110 as well as a full operating system to enable the computing device 1110 to interact with users, other programs, and other devices. The system memory 1130 may include one or more applications 1134 (e.g., the modeling software 122 or the tool path application 124 of FIG. 1) which may be executable by the processor 1120. For example, the one or more applications 1134 may include instructions executable by the processor 1120 to control the system 100 to compare an edge length difference of a projected tow path surface to a threshold to determine if an amount of curvature along the projected tow path surface is acceptable.

The processor 1120 may also communicate with one or more storage devices 1140, such as the memory 114 or the memory 154 of FIG. 1. For example, the one or more storage devices 1140 may include nonvolatile storage devices, such as magnetic disks, optical disks, or flash memory devices. The storage devices 1140 may include both removable and non-removable memory devices. The storage devices 1140 may be configured to store an operating system, images of operating systems, applications, and program data. The storage devices 1140 may also store the tow projection data 164, the edge length data 166, the threshold data 168, or a combination thereof. In a particular embodiment, the memory 1130, the storage devices 1140, or both, include tangible computer-readable media.

The processor 1120 may communicate with one or more input/output interfaces 1150 that enable the computing device 1110 to communicate with one or more input/output devices 1170 to facilitate user interaction. The input/output interfaces 1150 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1170 may include keyboards, pointing devices, displays, speakers, microphones, touch screens, and other devices. The processor 1120 may detect interaction events based on user input received via the input/output interfaces 1150. Additionally, the processor 1120 may send a display to a display device via the input/output interfaces 1150.

The processor 1120 may communicate with one or more devices 1180 via the one or more communications interfaces 1160. The one or more communications interfaces 1160 may include wired Ethernet interfaces, IEEE 802 wireless interfaces, other wireless communication interfaces, or other network interfaces. The one or more devices 1180 may include host computers, servers, workstations, and other computing devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of determining tow path surfaces associated with manufacturing a composite ply via fiber tows applied along a path forming one or more curves that include one or more inflection points, comprising:
   receiving part data corresponding to a part at a computing device;
   generating, with the computing device, an initial tow path surface based on the part data;
   computing, with the computing device from the initial tow path surface, a projected tow path surface corresponding to a projection of the initial tow path surface onto a layup surface;
   determining, with the computing device for particular start points and particular end points, edge lengths of opposing sides of the projected tow path surface;
   comparing, with the computing device, a difference between the edge lengths of the opposing sides to a threshold to determine if an amount of curvature along the projected tow path surface is acceptable, wherein each edge of the opposing sides of the projected tow path surface includes one or more curves including one or more inflection points, and wherein use of the difference accounts for cumulative steering effects of a tow; and outputting, from the computing device, a geometry file for an automated fiber placement machine based on the amount being acceptable, the geometry file including a plurality of machine readable instructions.

2. The method of claim 1, further comprising:

determining a vector field based on a projection of a 0 degree fiber orientation onto a surface of a part;

determining one or more course centerlines based on the vector field; and determining the initial tow path surface based on a particular centerline of the one or more course centerlines and a head normal direction for a fiber placement head, wherein the initial tow path surface corresponds to a tow roller path.

3. The method of claim 1, further comprising determining a head model based on one or more course centerlines and head normal directions for a fiber placement head, wherein determining the head model includes:

determining a plurality of initial tow path surfaces, including the initial tow path surface, based on the one or more course centerlines, a count of tows, and a tow width; and computing a plurality of projected tow path surfaces, including the projected tow path surface, based on the plurality of initial tow path surfaces.

4. The method of claim 1, wherein computing the projected tow path surface comprises computing a projection in a direction orthogonal to a direction of the initial tow path surface and to an axis of rotation of rollers of a head of an automated fiber placement machine.

5. The method of claim 1, wherein computing the projected tow path surface comprises computing a simulation of an applied tow that is draped onto the layup surface.

6. The method of claim 1, further comprising computing boundary edges of the projected tow path surface by projecting edges of a tow roller surface of the initial tow path surface in a head normal direction onto the layup surface, wherein the layup surface corresponds to a surface of a tool mandrel, and wherein the particular start points and particular end points correspond to a start point and an end point of a course, to inflection points of a curve of the course, a portion of the course, or a combination thereof.

7. The method of claim 1, further comprising:

determining the threshold based on a tow width of the initial tow path surface, a tow material, or a combination thereof; and generating, based on comparing the threshold to the difference in the edge lengths, an output indicating whether the amount of curvature along the projected tow path surface is acceptable.

8. The method of claim 1, further comprising, upon a determination that the amount of curvature along the projected tow path surface is acceptable, generating a plurality of tool paths based on a plurality of course centerlines, wherein the geometry file includes data indicating the tool paths, the data indicating the tool paths configured to instruct an automated fiber placement machine to apply a course according to the tool paths.

9. The method of claim 1, further comprising, upon a determination that the amount of curvature along the projected tow path surface is acceptable:

increasing a width of the tow to be applied to the layup surface to an adjusted tow width;

determining an adjusted initial tow path surface based on the adjusted tow width;

computing, from the adjusted initial tow path surface, an adjusted projected tow path surface corresponding to a projection of the adjusted initial tow path surface onto the layup surface;

determining, for the particular start points and the particular end points, adjusted edge lengths of the opposing sides of the adjusted projected tow path surface; and comparing a second difference between the adjusted edge lengths of the opposing sides to a second threshold, to determine if the amount of curvature of the adjusted projected tow path surface is acceptable.

10. The method of claim 1, further comprising, upon a determination that the amount of curvature along the projected tow path surface is not acceptable:

adjusting a course centerline to change a curvature of the initial tow path surface to generate an adjusted initial tow path surface;

computing, from the adjusted initial tow path surface, an adjusted projected tow path surface corresponding to a projection of the adjusted initial tow path surface onto the layup surface;

determining, for the particular start points and the particular end points, adjusted edge lengths of the opposing sides of the adjusted projected tow path surface; and comparing a second difference between the adjusted edge lengths of the opposing sides to the threshold, to determine if the amount of curvature of the adjusted projected tow path surface is acceptable.

11. The method of claim 1, further comprising, upon a determination that the amount of curvature along the projected tow path surface is not acceptable:

adjusting a curvature of the layup surface, wherein the adjusting the curvature of the layup surface results in an adjusted projected tow path surface and adjusted edge lengths of opposing sides of the adjusted projected tow path surface; and comparing a second difference between the adjusted edge lengths of the opposing sides to the threshold to determine if the amount of curvature of the adjusted projected tow path surface is acceptable.

12. The method of claim 1, further comprising, upon a determination that the amount of curvature along the projected tow path surface is not acceptable:

reducing a width of the tow to be applied to the layup surface, wherein the reducing the width of the tow results in an adjusted projected tow path surface and adjusted edge lengths of opposing sides of the adjusted projected tow path surface; and comparing a second difference between the adjusted edge lengths of the opposing sides to a second threshold to determine if the amount of curvature of the adjusted projected tow path surface is acceptable.

13. The method of claim 1, further comprising, upon a determination that the amount of curvature along the projected tow path surface is not acceptable:

changing a material of the tow to be applied to the layup surface, wherein changing the material of the tow results in adjusted edge lengths of the projected tow path surface, a different relaxation factor, or both;

determining a second difference based on the adjusted edge lengths, the different relaxation factor, or both; and comparing the second difference to a second threshold to determine if the amount of curvature is acceptable.

14. The method of claim 1, further comprising, upon a determination that the amount of curvature along the projected tow path surface is not acceptable, adjusting an expected level of structural performance of a part associated with the projected tow path surface.

15. The method of claim 1, further comprising:

computing, from a second initial tow path surface, a second projected tow path surface corresponding to a projection of the second initial tow path surface onto the layup surface;

determining, for particular second start and end points, second edge lengths of opposing sides of the second projected tow path surface;

determining a second difference between the second edge lengths of the opposing sides, to determine if an amount of curvature along the second projected tow path surface is acceptable, wherein the difference corresponds to a first application direction and the second difference corresponds to a second application direction; and selecting the first application direction or the second application direction based on the difference, the second difference, and the threshold.

16. The method of claim 1, further comprising determining the difference between the edge lengths of the opposing sides by:

calculating a first edge length for a first boundary edge of the projected tow path surface;

calculating a second edge length for a second boundary edge of the projected tow path surface;

subtracting the second edge length from the first edge length to determine a projected difference between the edge lengths of the opposing sides; and reducing the projected difference by a relaxation factor to determine the difference between the edge lengths of the opposing sides, wherein the relaxation factor is based on material properties of a tow material, process settings, an accumulated amount of edge length difference, or a combination thereof.

17. The method of claim 1, further comprising:

determining, for second start and end points, second edge lengths of the opposing sides of the projected tow path surface; and comparing a second difference between the second edge lengths of the opposing sides to a threshold, to determine if the amount of curvature along the projected tow path surface is acceptable.

18. A system for defining tow path surfaces associated with manufacturing a composite ply via fiber tows applied along a path forming one or more curves that include one or more inflection points, the system comprising:

a computing device configured to:

receive part data corresponding to a part;

generate an initial tow path surface based on the part data;

compute, from the initial tow path surface, a projected tow path surface corresponding to a projection of the initial tow path surface onto a layup surface;

determine, for particular start and end points, edge lengths of opposing sides of the projected tow path surface;

compare a difference between the edge lengths of the opposing sides to a threshold to determine if an amount of curvature along the projected tow path surface is acceptable, wherein each edge of the opposing sides of the projected tow path surface includes one or more curves including one or more inflection points, and wherein use of the difference accounts for cumulative steering effects of a tow; and output a geometry file for an automated fiber placement machine based on the amount being acceptable, the geometry file including a plurality of machine readable instructions.

19. The system of claim 18, further comprising the automated fiber placement machine, the automated fiber placement machine configured to generate the part based on the geometry file.

20. The system of claim 19, wherein the automated fiber placement machine includes multiple compaction rollers configured to move independently from one another.

* * * * *